(12) United States Patent
Hayashi

(10) Patent No.: US 12,736,828 B2
(45) Date of Patent: Sep. 15, 2026

(54) LASER INTERFEROMETER AND METHOD FOR CONTROLLING LASER INTERFEROMETER

(71) Applicant: SEIKO EPSON CORPORATION, Tokyo (JP)

(72) Inventor: Nobuhito Hayashi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 108 days.

(21) Appl. No.: 17/804,137

(22) Filed: May 26, 2022

(65) Prior Publication Data

US 2022/0390756 A1 Dec. 8, 2022

(30) Foreign Application Priority Data

May 28, 2021 (JP) ................................ 2021-089819

(51) Int. Cl.
*G02B 27/28* (2006.01)
*G01B 9/02* (2022.01)
(Continued)

(52) U.S. Cl.
CPC ....... *G02B 27/283* (2013.01); *G01B 9/02083* (2013.01); *G02B 5/1861* (2013.01); *G02B 6/02076* (2013.01); *G01B 2290/70* (2013.01)

(58) Field of Classification Search
CPC ............ G01B 9/02055; G01B 9/02064; G01B 9/02075; G01B 9/02076; G01B 9/02087;
(Continued)

(56) References Cited

U.S. PATENT DOCUMENTS 7,852,487 B2 12/2010 Rembe et al.
2002/0076161 A1* 6/2002 Hirabayashi ......... G02B 6/4201 385/39
(Continued)

FOREIGN PATENT DOCUMENTS

CN 202614366 U * 12/2012
CN 109341518 A * 2/2019 ......... G01B 9/02091
(Continued)

OTHER PUBLICATIONS

Manual for quartz crystals and circuit compositions for oscillators (Year: 2012).*
(Continued)

*Primary Examiner* — Uzma Alam
(74) *Attorney, Agent, or Firm* — CHIP LAW GROUP

(57) ABSTRACT

A laser interferometer that includes a laser light source configured to emit emission light, a light splitter configured to split the emission light into first split light, and second split light incident on an object to be measured, a light modulator disposed on an optical path on which the first split light advances, and configured to modulate the first split light into a reference light having a different frequency from a frequency of the first split light, an optical path length change unit provided between the light splitter and the light modulator, and configured to change a first optical path length, the first optical path length being an optical path length between the light splitter and the light modulator, a photoreceptor configured to receive an interference light of the reference light and an object light generated by reflecting the emission light at the object to be measured, and to output a light reception signal, and a controller configured to control operation of the optical path length change unit in accordance with a second optical path length, the second
(Continued)

optical path length being an optical path length between the light splitter and the object to be measured.

16 Claims, 12 Drawing Sheets

(51) Int. Cl.
*G02B 5/18* (2006.01)
*G02B 6/02* (2006.01)

(58) Field of Classification Search
CPC ............ G01B 9/02083; G01B 2290/70; G01B 9/02003; G01B 2290/35; G02B 27/283; G02B 5/1861; G02B 6/02076; G02B 2207/117; G02B 27/106; G02B 17/008; G01H 9/00
See application file for complete search history.

(56) References Cited

U.S. PATENT DOCUMENTS

2006/0250618 A1* 11/2006 Kawasaki .......... G01B 11/2441 356/512
2007/0086012 A1* 4/2007 Hatori ................ G01B 9/02044 356/450
2008/0024767 A1* 1/2008 Seitz .................. G01B 9/02091 356/73
2008/0273192 A1 11/2008 Nomoto et al.
2008/0285049 A1 11/2008 Rembe et al.
2014/0368832 A1* 12/2014 Salvade ................ G01S 7/4915 356/497

FOREIGN PATENT DOCUMENTS

DE 102007010389 A1 * 9/2008 ......... G01B 9/02002
JP 2002148110 A 5/2002
JP 2006212355 A * 8/2006
JP 2007285898 A * 11/2007
JP 2008216251 A 9/2008
JP 2008275515 A 11/2008
KR 101081370 B1 * 11/2011 ............. G02B 17/04

OTHER PUBLICATIONS

Office Action for JP Patent Application No. JP2021089819, issued on Nov. 26, 2024, 11 pages.
Office Action for JP Patent Application No. 2021089819, issued on Apr. 8, 2025, 10 pages.
Office Action for JP Patent Application No. 2021089819, issued on Sep. 24, 2025, 10 pages.
W. T. Wu et al, “Step Height Measurement by Using Heterodyne Central Fringe Identification Technique”, Proceedings of SPIE, pp. 1-8, vol. 7767, 2010.

* cited by examiner

LASER INTERFEROMETER AND METHOD FOR CONTROLLING LASER INTERFEROMETER

The present application is based on, and claims priority from JP Application Serial Number 2021-089819, filed May 28, 2021, the disclosure of which is hereby incorporated by reference herein in its entirety.

BACKGROUND

1. Technical Field

The present disclosure relates to a laser interferometer and a method for controlling a laser interferometer.

2. Related Art

JP 2007-285898 A discloses, as an apparatus for measuring vibration velocity of an object, a laser vibrometer that irradiates an object with laser light, and based on scattered laser light subjected to a Doppler shift, measures vibration velocity. In this laser vibrometer, the vibration velocity of the object is extracted from a Doppler signal included in the scattered laser light.

Also, the laser vibrometer described in JP 2007-285898 A is provided with an acousto-optic modulator (AOM) that shifts a frequency of laser light by changing an ultrasonic frequency supplied. By using this acousto-optic modulator to shift a frequency of laser light, and using laser light in which the frequency is shifted as reference light, vibration velocity of an object can be extracted from a Doppler signal.

In a method described in JP 2007-285898 A, a measurement result is dependent on characteristics of laser light. That is, there is a problem that, depending on a type of laser light source, accuracy of velocity measured for an object to be measured deteriorates.

SUMMARY

A laser interferometer according to an application example of the present disclosure includes a laser light source configured to emit emission light, a light splitter configured to split the emission light into first split light, and second split light incident on an object to be measured, a light modulator disposed on an optical path on which the first split light advances, and configured to modulate the first split light into reference light having a different frequency, an optical path length change unit provided between the light splitter and the light modulator, and configured to change a first optical path length being an optical path length between the light splitter and the light modulator, a photoreceptor configured to receive interference light of, object light generated by reflecting the emission light at the object to be measured, and the reference light, and to output a light reception signal, and a controller configured to control operation of the optical path length change unit in accordance with a second optical path length being an optical path length between the light splitter and the object to be measured.

A method for controlling a laser interferometer according to an application example of the present disclosure is a method of controlling a laser interferometer including a laser light source configured to emit emission light, a light splitter configured to split the emission light into first split light, and second split light incident on an object to be measured, a light modulator disposed on an optical path on which the first split light advances, and configured to modulate the first split light into reference light having a different frequency, an optical path length change unit provided between the light splitter and the light modulator, and configured to change an optical path length between the light splitter and the light modulator, and a photoreceptor configured to receive interference light of, object light generated by reflecting the emission light at the object to be measured, and the reference light, and to output a light reception signal, the method for controlling including preparing a sample of which displacement or velocity is known, as the object to be measured, acquiring the light reception signal and calculating a first measurement value being displacement or velocity of the sample based on the light reception signal acquired, when an optical path length between the light splitter and the light modulator is a first length, controlling operation of the optical path length change unit such that an optical path length between the light splitter and the light modulator is a second length, acquiring the light reception signal and calculating a second measurement value being displacement or velocity of the sample based on the light reception signal acquired, when an optical path length between the light splitter and the light modulator is a second length, and setting the optical path length between the light splitter and the light modulator to the first length, when the first measurement value is close to known displacement or velocity of the sample, and setting the optical path length between the light splitter and the light modulator to the second length, when the second measurement value is close to known displacement or velocity of the sample.

BRIEF DESCRIPTION OF THE DRAWINGS

FIG. 6 is a block diagram illustrating an example of a hardware configuration of a controller illustrated in FIG. 1.

DESCRIPTION OF EXEMPLARY EMBODIMENTS

A laser interferometer of the present disclosure will be described in detail below based on exemplary embodiments illustrated in accompanying drawings. 1.

First Exemplary Embodiment

First, a laser interferometer according to a first exemplary embodiment will be described.

Figure 1:
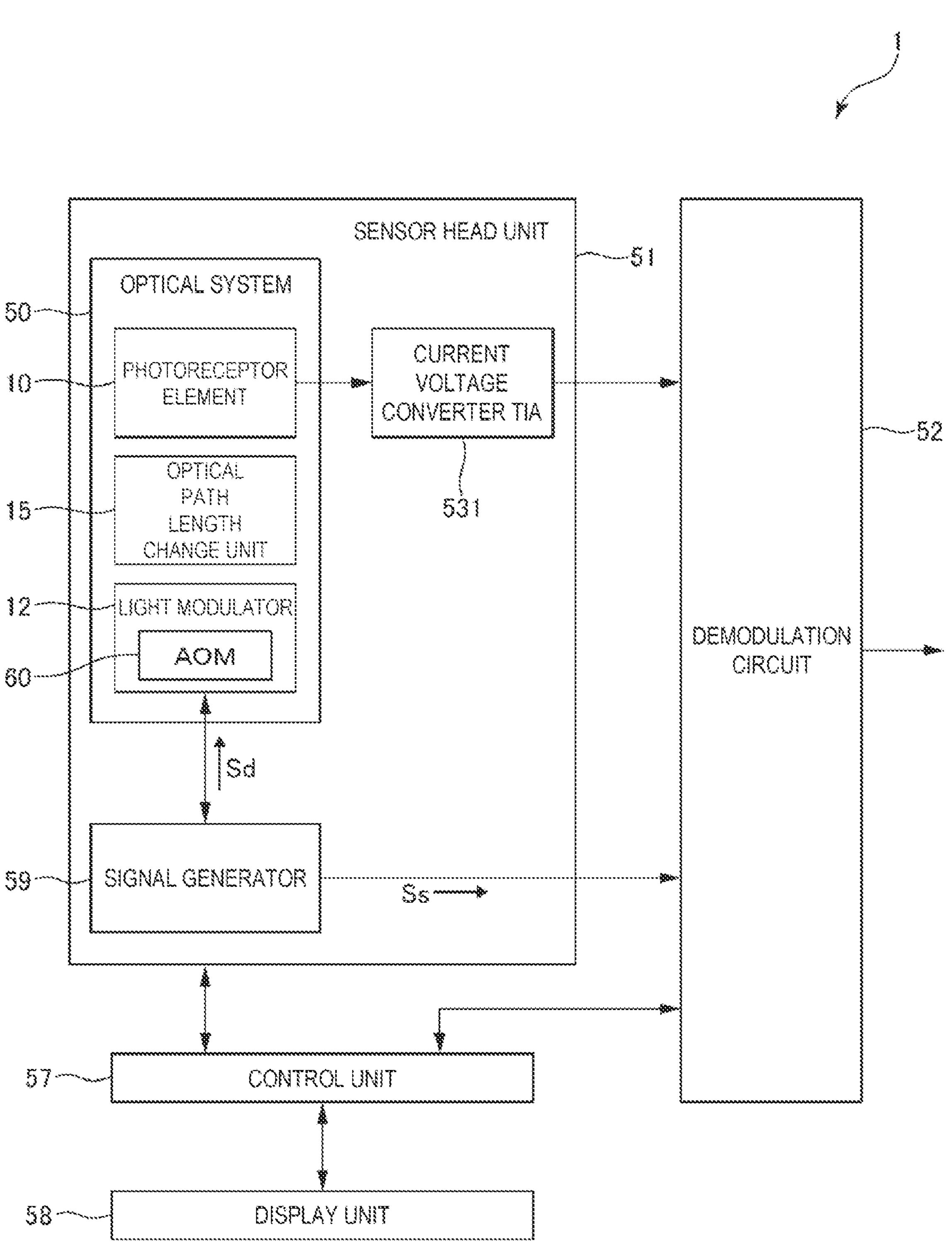
FIG. 1 is a function block diagram illustrating a laser interferometer according to a first exemplary embodiment.

FIG. 1 is a function block diagram illustrating the laser interferometer according to the first exemplary embodiment.

A laser interferometer 1 illustrated in FIG. 1 has a sensor head unit 51 provided with an optical system 50 and a signal generator 59, a demodulation circuit 52 to which a light reception signal from the optical system 50 is input, and a controller 57. The laser interferometer 1 measures displacement or velocity of an object to be measured by utilizing interference of laser light.

1.1. Sensor Head Unit

Figure 2:
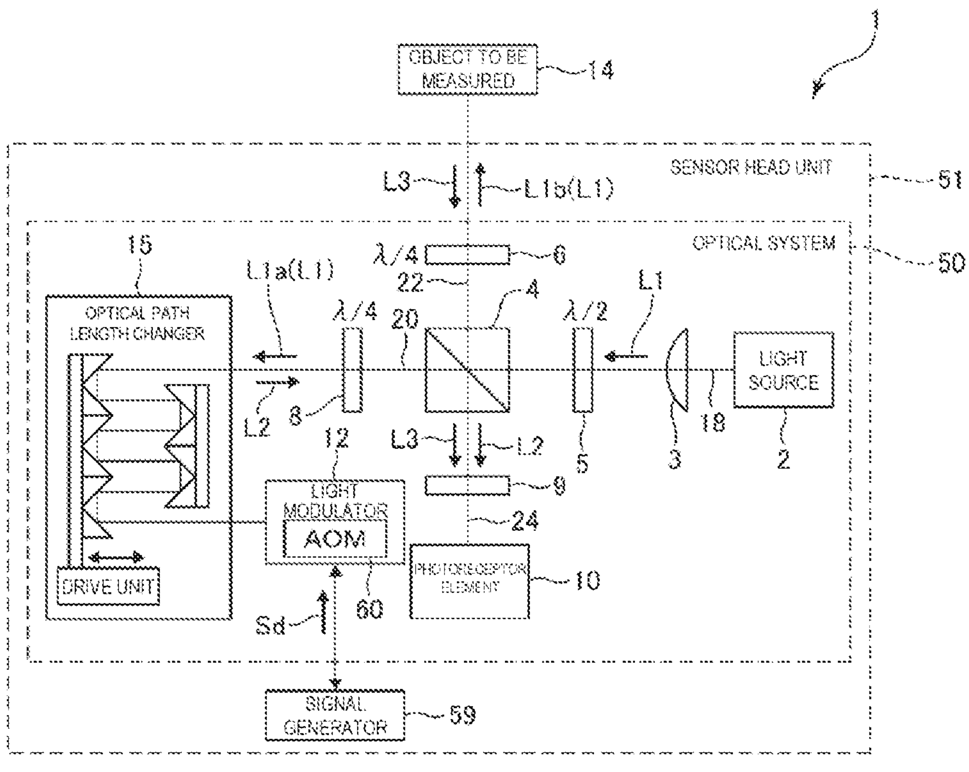
FIG. 2 is a schematic configuration diagram illustrating a sensor head unit illustrated in FIG. 1.

FIG. 2 is a schematic configuration diagram illustrating the sensor head unit 51 illustrated in FIG. 1.

As described above, the sensor head unit 51 includes the optical system 50.

As illustrated in FIG. 2, the optical system 50 includes a light source 2 (laser light source), a collimating lens 3, a polarizing beam splitter 4, a ½-wavelength plate 5, a ¼-wavelength plate 6, a ¼ wavelength plate 8, an analyzer 9, a photoreceptor 10, a frequency-shifter type light modulator 12, and an optical path length change unit 15.

The light source 2 emits emission light L1 (first laser light) having a predetermined wavelength. The photoreceptor 10 converts received light into an electrical signal. The light modulator 12 includes an AOM 60, modulates the emission light L1, and generates the reference light L2 (second laser light) including a modulation signal. The emission light L1 incident on an object to be measured 14 in a moving state is reflected as object light L3 (third laser light) including a sample signal derived from the object to be measured 14.

An optical path of the emission light L1 emitted from the light source 2 is referred to as an optical path 18. The ½-wavelength plate 5 and a collimating lens 3 are disposed on the optical path 18 in this order from the polarizing beam splitter 4 side. The optical path 18 is linked to the optical path 20 by transmission of the polarizing beam splitter 4. On the optical path 20, the ¼-wavelength plate 8, the optical path length change unit 15, and the light modulator 12 are disposed in this order from the polarizing beam splitter 4 side. The optical path 18 is linked to the optical path 22 by reflection of the polarizing beam splitter 4. The ¼-wavelength plate 6 and the object to be measured 14 are disposed on the optical path 22 in this order from the polarizing beam splitter 4 side. On an optical path 24, the analyzer 9 and the photoreceptor 10 are disposed in this order from the polarizing beam splitter 4 side.

Also, the optical path 20 and the optical path 22 are linked to the optical path 24.

The emission light L1 emitted from the light source 2 is incident on the light modulator 12 via the optical path 18 and the optical path 20. Further, emission light L1 is incident on the object to be measured 14 via the optical path 18 and the optical path 22. The reference light L2 generated by the light modulator 12 is incident on the photoreceptor 10 via the optical path 20 and the optical path 24, and. The object light L3 generated by reflection at the object to be measured 14 is incident on the photoreceptor 10 via the optical path 22 and the optical path 24.

Each unit of the optical system 50 will be further described below.

1.1.1. Light Source

The light source 2 is a laser light source that emits the emission light L1 having a coherence property. Examples of the light source 2 include, for example, a gas laser such as an He—Ne laser, semiconductor laser elements such as a DFB-LD (Distributed feedback-laser diode), an FBG-LD (laser diode with Fiber bragg Grating), a VCSEL (Vertical Cavity Surface Emitting Laser), and an FP-LD (Fabry-Perot Laser Diode), and the like.

The light source 2 particularly may include a semiconductor laser element. This allows the light source 2 to be particularly miniaturized. Thus, miniaturization of the laser interferometer 1 can be achieved. In particular, of the laser interferometer 1, the sensor head unit 51 in which the optical system 50 is accommodated can be miniaturized and made lighter, which is also useful in that operability of the laser interferometer 1 can be improved.

The emission light L1 sequentially passes through the collimating lens 3 and the ½-wavelength plate 5, and is incident on the polarizing beam splitter 4. The collimating lens 3 is a lens that collimates the transmitted emission light L1. The ½-wavelength plate 5 is an optical element that rotates a polarization direction of linear polarized light.

1.1.2. Polarizing Beam Splitter

The polarizing beam splitter 4 is an optical element that splits the emission light L1 into transmitted light L1*a* (first split light) and reflected light L1*b* (second split light). Further, the polarizing beam splitter 4 has a function of transmitting P-polarized light and reflecting S-polarized light. Hereinafter, a case is considered in which the emission light L1, which is linear polarized light and in which a ratio of the P-polarized light and the S-polarized light is set to 50:50, for example, is incident on the polarizing beam splitter 4.

The polarizing beam splitter 4, as described above, transmits S-polarized light of the emission light L1, and reflects P-polarized.

The transmitted light L1$a$, which is the P-polarized light transmitted through the polarizing beam splitter 4, is converted to circularly polarized light at the ¼-wavelength plate 8, and is incident on the light modulator 12. The circularly polarized light of the transmitted light L1$a$ incident on light modulator 12 is subjected to a frequency shift by $f_m$ [Hz] and reflected as the reference light L2. Thus, the reference light L2 includes a modulation signal having the frequency $f_m$ [Hz]. The reference light L2 is converted to S-polarized light, when being transmitted through the ¼-wavelength plate 8 again, via the optical path length change unit 15. The S-polarized light of the reference light L2 is reflected at the polarizing beam splitter 4, is transmitted through the analyzer 9, and is incident on the photoreceptor 10.

The reflected light L1$b$, which is the S-polarized light reflected at the polarizing beam splitter 4, is converted to circularly polarized light at the ¼-wavelength plate 6, and is incident on the object to be measured 14 in a moving state. The circularly polarized light of the reflected light L1$b$ incident on the object to be measured 14 is subjected to a Doppler shift by $f_d$ [Hz], and is reflected as the object light L3. Thus, the object light L3 includes a sample signal having the frequency $f_d$ [Hz]. The object light L3 is converted to P-polarized light when again being transmitted through the ¼-wavelength plate 6. The P-polarized light of the object light L3 is transmitted through the polarizing beam splitter 4, is transmitted through the analyzer 9, and is incident on the photoreceptor 10.

As described above, since the emission light L1 has the coherence property, the reference light L2 and the object light L3 are incident on the photoreceptor 10 as interference light.

Note that, a non-polarizing beam splitter may be used instead of the polarizing beam splitter. In this case, since the ¼-wavelength plate 6 and the ¼-wavelength plate 8 are not required, the laser interferometer 1 can be miniaturized by reducing the number of parts.

1.1.3. Analyzer

S-polarized light and P-polarized light perpendicular to each other are independent of each other, and thus a beat due to interference does not appear by being simply superimposed. Thus, a light wave obtained by superimposing the S-polarized light and the P-polarized light is transmitted through the analyzer 9 inclined by 45° with respect to both the S-polarized light and the P-polarized light. By using the analyzer 9, light having components common to each other can be transmitted, and interference can be caused to occur. As a result, in the analyzer 9, the reference light L2 and the object light L3 interfere, and interference light having a frequency of $|f_m - f_d|$ [Hz] is generated.

1.1.4. Photoreceptor

The reference light L2 and the object light L3 are incident on the photoreceptor 10 via the polarizing beam splitter 4 and the analyzer 9. Thus, the reference light L2 and the object light L3 are subjected to optical heterodyne interference, and interference light having a frequency of $|f_m - f_d|$ [Hz] is incident on the photoreceptor 10. The photoreceptor 10 outputs, via a current voltage converter 531, a light reception signal of the interference light toward the demodulation circuit 52. In the demodulation circuit 52, it is possible to ultimately determine movement of the object to be measured 14, that is, vibration velocity or displacement, by demodulating a sample signal in a manner described later from this light reception signal. Examples of the photoreceptor 10 include a photodiode and the like.

Note that, the current voltage converter 531 is a transimpedance amplifier (TIA), and converts current output from the photoreceptor 10 into a voltage signal.

1.1.5. Light Modulator

The light modulator 12 illustrated in FIGS. 1 and 2 includes the AOM 60. The AOM 60 is an acousto-optical modulator. The acousto-optical modulator is a frequency modulator that vibrates a crystal with a piezoelectric element, creates a compressional standing wave in the crystal, which is utilized as a diffraction grating. Although not illustrated, the AOM 60 illustrated in FIGS. 1 and 2 includes the above-mentioned crystal and a mirror. Light transmitted through the crystal via the optical path 20 is reflected at the mirror, and then is transmitted through the crystal again. Thus, the AOM 60 generates the reference light L2 from the incident transmitted light L1$a$.

A radio frequency signal is input to the AOM 60 from the signal generator 59 described below. This signal drives the piezoelectric element, causing the crystal to vibrate.

Note that, the light modulator 12 may include various light modulators such as an electro-optical modulator (EOM) instead of the AOM 60.

1.1.6. Signal Generator

The signal generator 59 generates a drive signal Sd input to the AOM 60. Further, the signal generator 59 generates a reference signal Ss input to the demodulation circuit 52.

The signal generator 59 may be anything so long as a signal having good characteristics such as frequency stability, low jitter, or the like can be generated. Examples of a specific signal generator 59 include, for example, a function generator, a signal generator, a crystal oscillator, a PLL (Phase Locked Loop) circuit, and the like.

1.1.7. Optical Path Length Change Unit

The optical path length change unit 15 illustrated in FIG. 2 has a function of changing an optical path length of the optical path 20 in which the transmitted light L1$a$ (first split light) advances. The optical path 20 is an optical path that links the polarizing beam splitter 4 and the light modulator 12.

1.1.7.1. First Configuration Example of Optical Path Length Change Unit

The optical path length change unit 15 illustrated in FIG. 2 includes a first reflection element 151 and a second reflection element 152, and a drive unit 153 that drives the first reflection element 151. The first reflection element 151 and the second reflection element 152 are each an optical element that switches the optical path 20 in which the transmitted light L1$a$ advances. The drive unit 153 changes a distance between the first reflection element 151 and the second reflection element 152 by moving the first reflection element 151.

The drive unit 153 generates driving force and moves the first reflection element 151 in parallel with the optical path 20, for example. This makes it possible to change the optical path length of the optical path 20. Further, the drive unit 153 holds the first reflection element 151 at a targeted position. Note that, the drive unit 153 may be configured to move the second reflection element 152 rather than the first reflection element 151, or may be configured to move both the first reflection element 151 and the second reflection element 152. In addition, a direction of the movement does not matter as far as the optical path length of the optical path 20 can be changed.

As the drive unit 153, a device that moves the first reflection element 151 along a straight line is used, and examples include, for example, a linear stage, an electric actuator, a piezo actuator, and the like.

When the drive unit 153 moves the first reflection element 151, a physical distance between the first reflection element 151 and the second reflection element 152 changes. This also changes an optical path length (optical distance) between the polarizing beam splitter 4 and the light modulator 12 (optical path 20). By changing the optical path length of the optical path 20 in this manner, an optical path length between the polarizing beam splitter 4 and the object to be measured 14 (optical path 22) and the optical path length of the optical path 20 can be made equal. When these optical path lengths are equal to each other, displacement measurement accuracy of the object to be measured 14 can be increased according to the following principle.

In the demodulation circuit 52, a sample signal derived from the object to be measured 14 can be demodulated from a light reception signal. Then, displacement of the object to be measured 14 can be determined from the sample signal. When this displacement measurement accuracy is defined as Δd, the measurement accuracy Δd is represented by the following Formula (1).

[Mathematical Equation 1]

$$\Delta d = \frac{\lambda\Delta\phi}{4\pi n} + d\left(\frac{\Delta f}{f} + \frac{\Delta n}{n}\right) \tag{1}$$

λ: Wavelength of Emitted Light L1

Δϕ: Phase of Sample Signal n: Refractive Index of Atmosphere d: Difference between Optical Path Length of Optical Path 22 and Optical Path Length of Optical path 20 (Optical Path Difference)

Δf: Line Width of Emitted Light L1 (Phase Fluctuation)

f: Frequency of Emitted Light L1 c: Velocity of Light

Δn: Fluctuation of Refractive Index of Atmosphere

In the above Formula (1), when an optical path difference d is 0, a second term and a third term on a right-hand side are also 0. In this case, the displacement measurement accuracy Δd is theoretically not affected by a line width Δf (phase fluctuation) of the emission light L1, or fluctuation Δn of a refractive index of an atmosphere. On the other hand, when the optical path difference d is not 0, the line width Δf or the fluctuation Δn of the refractive index of the atmosphere affects the displacement measurement accuracy Δd. In particular, the line width Δf of the emission light L1 may be a relatively large value depending on a type of the light source 2. Thus, depending on the type of the light source 2, it is concerned that the displacement measurement accuracy Δd of the object to be measured 14 worsens.

Thus, in the present exemplary embodiment, operation of the optical path length change unit 15 is controlled by the controller 57 such that the optical path difference d approaches 0, that is, the optical path length of the optical path 22 and the optical path length of the optical path 20 approach each other. Thus, the displacement measurement accuracy Δd is theoretically less likely to be affected by the line width Δf [Hz] of the emission light L1. As a result, the displacement of the object to be measured 14 can be accurately measured regardless of the type of the light source 2. Also, velocity of the object to be measured 14 can be calculated from the displacement.

Note that, in a common laser light source, laser light has a frequency of 100 THz. This frequency does not change by more than one order of magnitude even when a type of the laser light source is changed. Furthermore, in the above Formula (1), the second term is often dominant compared to the third term. In view of the above, it is conceivable that a value of the dΔf of the above Formula (1) greatly affects the measurement accuracy Δd. As a result of a study by the inventors, it has been found that the sufficient measurement accuracy Δd is obtained when $d\Delta f \leq 1\times10^8$, even when the optical path difference d [m] is not 0.

Table 1 below illustrates four types of laser light sources, a general line width Δf [Hz] of laser light emitted from each laser light source, and a reference value in a range of the optical path difference d [m] that is acceptable for dΔf $1\times10^8$.

TABLE 1

| Laser Light Source | Line Width Δf | Range of Optical Path Difference d |
|---|---|---|
| He-Ne Laser | 1 MHz | 100 m or less |
| FBG-LD | 1 MHz | 100 m or less |
| VCSEL | Several Tens of MHz | 10 m or less |
| FP-LD | Several Tens of MHz | 10 m or less |

As illustrated in Table 1 above, since the line width Δf varies depending on the type of laser light source, the range of the optical path difference d acceptable during adjustment also varies accordingly.

Figure 3:
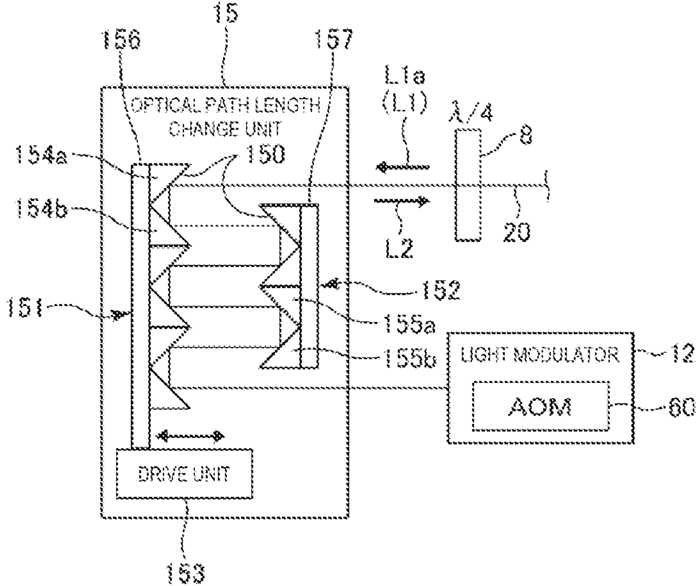
FIG. 3 is a partially enlarged view of FIG. 2, and is a diagram illustrating an optical path length change unit according to a first configuration example.

FIG. 3 is a partially enlarged view of FIG. 2, and is a diagram illustrating the optical path length change unit 15 according to a first configuration example.

The first reflection element 151 illustrated in FIG. 3 includes right-angle prism mirrors 154*a*, 154*b*, and a substrate 156 that supports these mirrors. The right-angle prism mirrors 154*a* and 154*b* are each an optical element having a light reflecting surface 150 that intersects the optical path 20 at an angle of 45°. Then, the right-angle prism mirrors 154*a* and 154*b* are disposed so that an angle formed by the light reflecting surfaces 150 is 90°. Accordingly, the optical path 20 extending from the polarizing beam splitter 4 is folded back at a unit of a pair of the right-angle prism mirrors 154*a* and 154*b*, and heads toward the second reflection element 152. The substrate 156 supports a plurality of pairs of the right-angle prism mirrors 154*a* and 154*b* collectively.

The second reflection element 152 illustrated in FIG. 3 includes right-angle prism mirrors 155*a*, 155*b*, and a substrate 157 that supports these mirrors. The right-angle prism mirrors 155*a* and 155*b* are each an optical element having the light reflecting surface 150 that intersects the optical path 20 at an angle of 45°. Then, the right-angle prism mirrors 155*a* and 155*b* are disposed so that an angle formed by the light reflecting surfaces 150 is 90°. As a result, the optical path 20 extending from the first reflection element 151 is folded back at a unit of a pair of the right-angle prism mirrors 155*a* and 155*b*, and heads again toward the first reflection element 151. The substrate 157 supports a plurality of pairs of the right-angle prism mirrors 155*a* and 155*b* collectively.

The right-angle prism mirrors 154*a*, 154*b*, 155*a*, and 155*b* are highly accurate and easily obtained. Therefore, the right-angle prism mirror is useful as an optical element used in the first reflection element 151.

By folding the optical path 20 using the first reflection element 151 and the second reflection element 152, it is possible to link the first reflection element 151 and the second reflection element 152 with the optical path 20. Then, when the drive unit 153 moves the first reflection element 151, the physical distance between the first reflection element 151 and the second reflection element 152 changes. This makes it also possible to change the optical path length of the optical path 20. Thus, according to the optical path length change unit 15, the optical path length of the optical path 20 can be brought close to the optical path length of the optical path 22, and may be made equal. As a result, the optical path difference d of the above Formula (1) can be brought close to 0, and may be made 0.

As described above, the laser interferometer 1 according to the present exemplary embodiment includes the light source 2 (laser light source), the polarizing beam splitter 4 (light splitter), the light modulator 12, the optical path length change unit 15, the photoreceptor 10, and the controller 57. The light source 2 emits the emission light L1. The polarizing beam splitter 4 splits the emission light L1 into the transmitted light L1*a* (first split light), and the reflected light L1*b* (second split light) incident on the object to be measured 14. The light modulator 12 is disposed on the optical path 20 in which the transmitted light L1*a* advances, and modulates the transmitted light L1*a* into the reference light L2 having a different frequency. The optical path length change unit 15 is provided between the polarizing beam splitter 4 and the light modulator 12, and changes a first optical path length (optical path length of the optical path 20) that is an optical path length between the polarizing beam splitter 4 and the light modulator 12. The photoreceptor 10 receives the interference light of the object light L3 generated by reflecting the emission light L1 at the object to be measured 14, and the reference light L2, and outputs a light reception signal. The controller 57 controls operation of the optical path length change unit 15 in accordance with a second optical path length (optical path length of the optical path 22) that is the optical path length between the polarizing beam splitter 4 and the object to be measured 14.

According to such a configuration, since the optical path length of the optical path 20 can be changed, the optical path length of the optical path 20 can be adjusted so as to approach the optical path length of the optical path 22. As a result, the optical path difference d of the above Formula (1) can be brought close to 0, and theoretically, the displacement measurement accuracy Δd is less likely to be affected by the line width Δf of the emission light L1. As a result, the displacement of the object to be measured 14 can be accurately measured regardless of the type of the light source 2.

In addition, even when the light source 2 having a relatively large line width Δf of the emission light L1 is used, as far as the optical path length of the optical path 20 can be changed, a decrease in the displacement measurement accuracy Δd can be suppressed according to the principle described above. Therefore, options of the light source 2 can be increased without sacrificing the displacement measurement accuracy Δd.

Operation examples of the optical path length change unit 15 controlled by the controller 57 include controlling the operation of the optical path length change unit 15 so as to reduce the optical path difference d between the first optical path length (optical path length of the optical path 20) and the second optical path length (optical path length of the optical path 22).

In this way, since the optical path difference d of the above Formula (1) approaches 0, the displacement measurement accuracy Δd in the laser interferometer 1 is less likely to be affected by the line width Δf of the emission light L1.

More specifically, the controller 57 controls the operation of the optical path length change unit 15 such that the optical path difference d [m] between the first optical path length and the second optical path length, and the line width Δf of the emission light L1 satisfy $0 \leq d \times f \leq 1 \times 10^8$.

By controlling the optical path length change unit 15 to satisfy such a condition, even when the line width Δf of the emission light L1 is relatively large, it is possible to sufficiently increase the displacement measurement accuracy Δd in the laser interferometer 1.

Of the light source 2 described above, the VCSEL (Vertical Cavity Surface Emitting Laser) or the FP-LD (Fabry-Perot Laser Diode) has a relatively large line width Δf of the emission light L1, but is inexpensive. Therefore, it is possible to achieve cost reduction of the laser interferometer 1 by using the these as the light source 2.

On the other hand, of the light source 2 described above, the He—Ne laser or the FBG-LD (laser diode with fiber bragg grating) has a relatively small line width Δf of the emission light L1. Therefore, it is possible to achieve further high accuracy of the laser interferometer 1 by using these as the light source 2.

Further, the optical path length change unit 15 illustrated in FIG. 3 includes the first reflection element 151 and the second reflection element 152 as a plurality of optical elements, and the drive unit 153 that changes a distance between the optical elements. The first reflection element 151 and the second reflection element 152 are optical elements that switch the optical path 20 in which the transmitted light L1*a* (first split light) advances. The drive unit 153 has a function of moving at least one of the plurality of optical elements.

According to such an optical path length change unit 15, a moving distance of the optical element by the drive unit 153 and an amount of change in the optical path length of the optical path 20 can be easily associated with each other. Therefore, it is possible to realize the optical path length change unit 15 that can easily adjust the optical path length. Further, an actuator that can be used as the drive unit 153 is easily obtained and has high accuracy in adjusting a movement amount. Thus, according to the optical path length change unit 15 of such a configuration, an optical path length can be adjusted with high accuracy.

Additionally, the right-angle prism mirrors 154*a*, 154*b*, 155*a*, and 155*b* are the optical elements that each have the light reflecting surface 150, and reflect the transmitted light L1*a*, as described above. By using such optical elements, structure of the optical path length change unit 15 is simplified, and a loss associated with changing an optical path length can be suppressed.

Further, the first reflection element 151 and the second reflection element 152 each include at least a pair of the units described above, or may include two or more pairs of the units described above. For example, the first reflection element 151 illustrated in FIG. 3 includes three pairs of the units described above, and the second reflection element 152 includes two pairs of the units described above.

Since the first reflection element 151 and the second reflection element 152 are provided with a plurality of the units, the transmitted light L1*a* and the reference light L2 each reciprocate between the first reflection element 151 and the second reflection element 152 for a plurality of times. As a result, an optical path length that is longer than a distance to which the first reflection element 151 is moved can be changed. That is, when changing the same optical path length, the distance to which the first reflection element 151 is moved is small. Thus, the optical path length change unit 15 illustrated in FIG. 3 is easily miniaturized.

Although the configuration of the optical path length change unit 15 illustrated in FIG. 2 has been described above, the configuration of the optical path length change unit 15 is not limited to the above as far as the optical path length of the optical path 20 can be changed.

1.1.7.2. Second Configuration Example of Optical Path Length Change Unit

Figure 4:
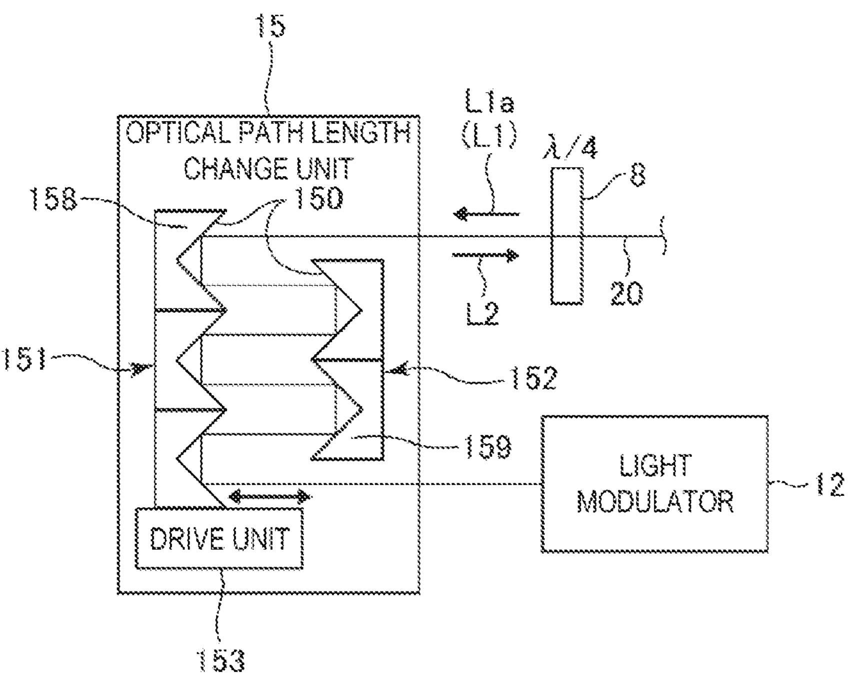
FIG. 4 is a diagram illustrating an optical path length change unit according to a second configuration example.

Next, the optical path length change unit 15 according to a second configuration example will be described. FIG. 4 is a diagram illustrating the optical path length change unit 15 according to the second configuration example.

The optical path length change unit 15 illustrated in FIG. 4 is similar to the optical path length change unit 15 illustrated in FIG. 3 except that the following matters are different. In the following description, description of differences from the optical path length change unit 15 illustrated in FIG. 3 is omitted.

The first reflection element 151 illustrated in FIG. 4 includes a roof prism mirror 158. The second reflection element 152 illustrated in FIG. 4 includes a roof prism mirror 159. The roof prism mirrors 158 and 159 are also referred to as hollow retroreflectors, and each correspond to an element in which the pair of right-angle prism mirrors 154*a* and 154*b* included in the first configuration example described above are integrated. By using such roof prism mirrors 158 and 159, the number of parts constituting the first reflection element 151 and the second reflection element 152 can be reduced compared to the first configuration example. Thus, the optical path length change unit 15 illustrated in FIG. 4 is easily assembled and miniaturized.

1.1.7.3. Third Configuration Example of Optical Path Length Change Unit

Figure 5:
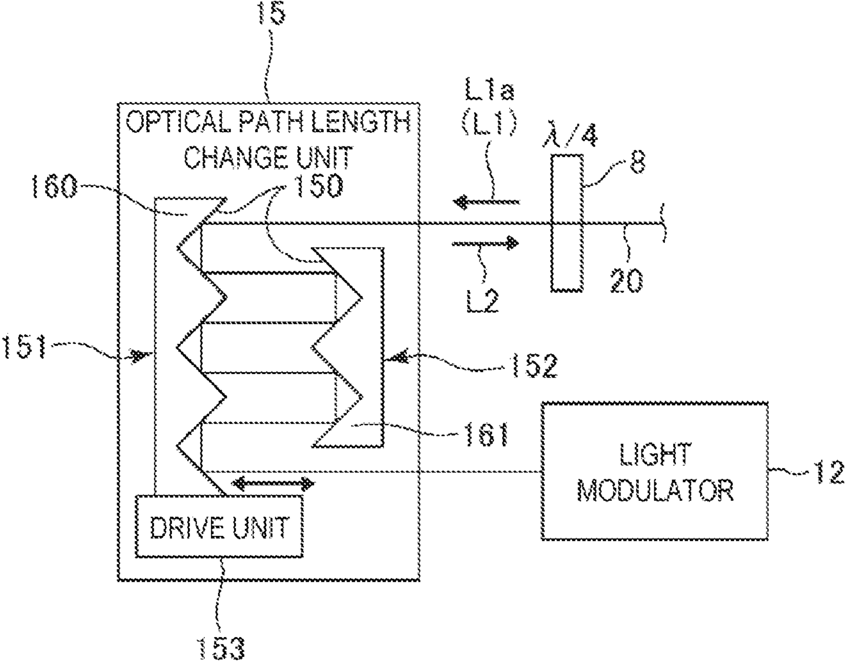
FIG. 5 is a diagram illustrating an optical path length change unit according to a third configuration example.

Next, the optical path length change unit 15 according to a third configuration example will be described. FIG. 5 is a diagram illustrating the optical path length change unit 15 according to the third configuration example.

The optical path length change unit 15 illustrated in FIG. 5 is similar to the optical path length change unit 15 illustrated in FIG. 3 except that the following matters are different. In the following description, description of differences from the optical path length change unit 15 illustrated in FIG. 3 is omitted.

The first reflection element 151 illustrated in FIG. 5 includes an integrated prism mirror 160. The second reflection element 152 illustrated in FIG. 5 includes an integrated prism mirror 161. The integrated prism mirror 160 corresponds to an element in which the plurality of right-angle prism mirrors 154*a* and 154*b* included in the first reflection element 151 according to the first configuration example described above are integrated. Similarly, the integrated prism mirror 161 corresponds to an element in which the plurality of right-angle prism mirrors 155*a* and 155*b* included in the second reflection element 152 according to the first configuration example described above are integrated. By using such integrated prism mirrors 160 and 161, the number of parts constituting the first reflection element 151 and the second reflection element 152 can be reduced compared to the first configuration example and the second configuration example. Thus, the optical path length change unit 15 illustrated in FIG. 5 is particularly easy to be assembled and miniaturized.

The integrated prism mirrors 160 and 161 are manufactured by, after forming a structure by glass, resin, or the like, for example, forming a high-reflection mirror at a surface of the structure. Examples of the high-reflection mirror include dielectric multilayer films, metal films, and the like.

1.2. Controller

The controller 57 controls operation of the sensor head unit 51 and operation of the demodulation circuit 52.

Specifically, the controller 57 operates in at least two operating modes of an optical system adjustment mode and a measurement mode described later. In the optical system adjustment mode, the controller 57 adjusts and sets an optical path length of the optical path 20 to a suitable optical path length by the optical path length change unit 15. In the measurement mode, the object to be measured 14 is measured while the set optical path length is maintained.

FIG. 6 is a block diagram illustrating an example of a hardware configuration of the controller 57 illustrated in FIG. 1.

The hardware configuration of the controller 57 illustrated in FIG. 6 includes a processor 571, a memory 572, and an external interface 573 coupled to each other by an internal bus 570. When a program stored in the memory 572 is read and executed by the processor 571, for example, various types of control by the controller 57 are achieved such as, for example, switching control between the optical system adjustment mode and the measurement mode, controlling operation of the sensor head unit 51 and the demodulation circuit 52 in each mode, and the like.

Examples of the processor 571 include, for example, a CPU (Central Processing Unit), a DSP (Digital Signal Processor), and the like. Examples of the memory include, for example, a volatile memory such as a RAM (random access memory), a non-volatile memory such as a ROM (Read Only Memory), a removable external storage device, and the like. Examples of the external interface include, for example, a USB (Universal Serial Bus), an RS-232C, Ethernet (registered trademark), a wireless LAN (Local Area Network) and the like.

Additionally, a part or all of the controller 57 may be implemented by hardware such as an LSI (Large Scale Integration), an ASIC (Application Specific Integrated Circuit), an FPGA (Field-Programmable Gate Array), and the like.

Further, the laser interferometer 1 illustrated in FIG. 1 includes a display unit 58 coupled to the controller 57. The controller 57 controls display operation of the display unit 58. Accordingly, a demodulation processing result of the demodulation circuit 52, error contents, notification contents, and the like are displayed on the display unit 58 to inform a user. Examples of the display unit 58 include a liquid crystal display device, and the like, for example.

1.3. Demodulation Circuit

The demodulation circuit 52 performs demodulation processing of demodulating a sample signal derived from the object to be measured 14 from a light reception signal output from the photoreceptor 10. The sample signal includes, for example, phase information and frequency information. Then, displacement information of the object to be measured 14 can be acquired from the phase information, and velocity information of the object to be measured 14 can be acquired from the frequency information. When different types of information can be acquired in this manner, the laser interferometer 1 can have a function as a displacement meter or a velocimeter, and the functions thereof can be enhanced.

The demodulation processing by the demodulation circuit 52 can be performed by a known frequency modulation wave demodulator. In the demodulation processing, the reference signal Ss generated by the signal generator 59 is used.

2. Second Exemplary Embodiment

Next, a method for controlling a laser interferometer according to a second exemplary embodiment will be described.

Figure 7:
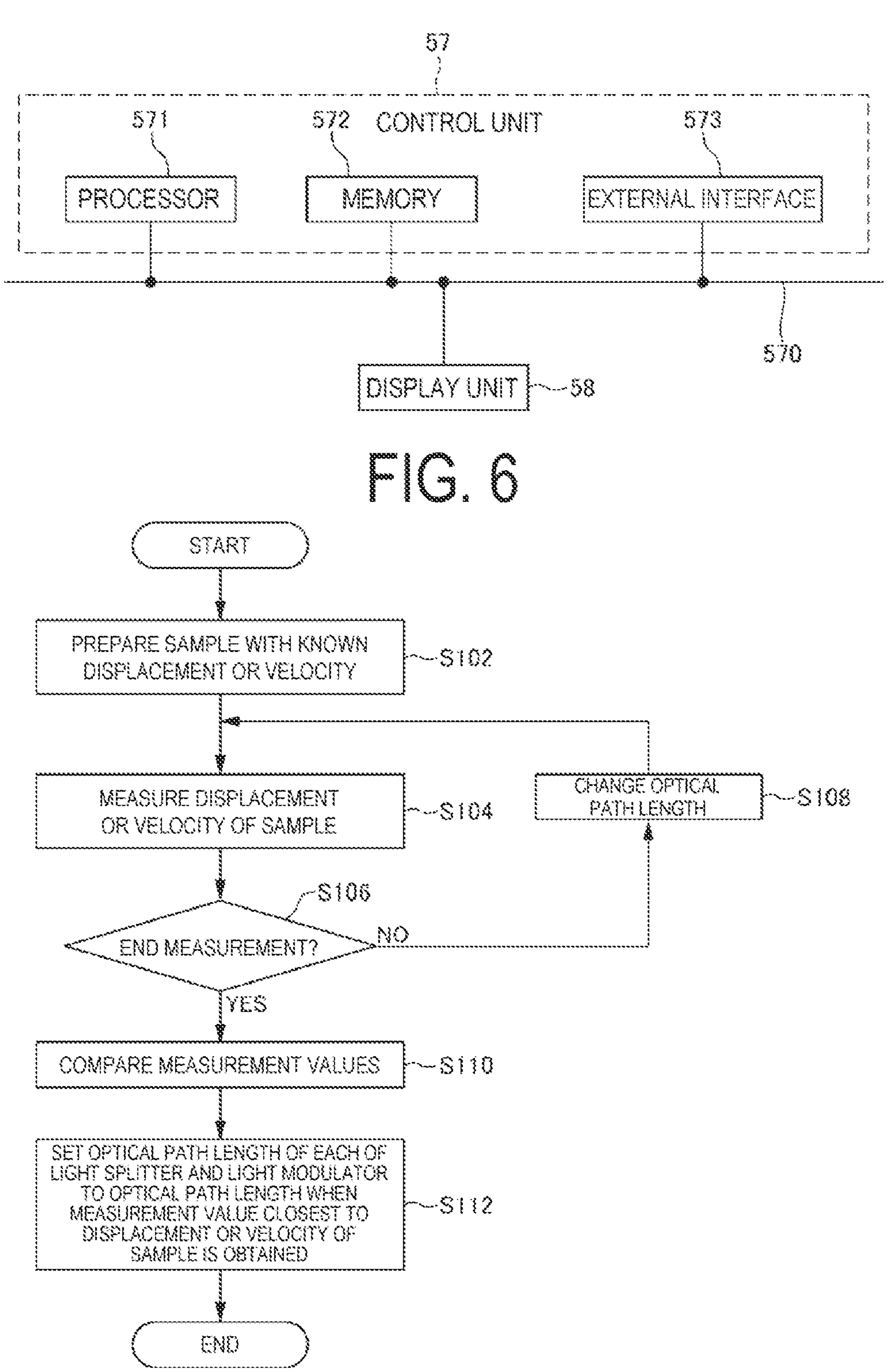
FIG. 7 is a flowchart illustrating a method for controlling a laser interferometer according to a second exemplary embodiment.

FIG. 7 is a flowchart illustrating the method for controlling the laser interferometer according to the second exemplary embodiment.

The method for controlling illustrated in FIG. 7 is, for example, a method for controlling operation of the laser interferometer 1 according to the first exemplary embodiment, and includes a preparation step S102, a measurement step S104, an end determination step S106, an optical path length change step S108, a measurement value comparison step S110, and an optical path length set step S112. In this method for controlling, as described above, operation of the optical path length change unit 15 is controlled so that an optical path length of the optical path 22 of the laser interferometer 1 and an optical path length of the optical path 20 are equal to each other. Hereinafter each step will be described.

2.1. Preparation Step

In the preparation step S102, a sample having a known displacement or velocity is prepared as the object to be measured 14. Examples of the sample include, for example, piezo actuators, oscillators, and the like. Note that, the sample is disposed at the same position as a position where the object to be measured 14 is disposed in a measurement mode.

2.2 Measurement Step

In the measurement step S104, the laser interferometer 1 measures displacement or velocity of the sample. An optical path length of the optical path 20 during the measurement is defined as a “first length”. Then, a measurement value when the optical path length is the first length is defined as a “first measurement value”.

2.3. End Determination Step

In the end determination step S106, whether or not to end the measurement is determined based on whether measurement values to be compared in the measurement value comparison step S110 described below are prepared or not. Specifically, when measurement values of an object to be compared with the first measurement value is sufficiently prepared, YES is selected in the end determination step S106, and the measurement is ended. On the other hand, when the measurement values of the object to be compared with the first measurement value are not sufficiently prepared, NO is selected in the end determination step S106, and the processing transits to the optical path length change step S108.

2.4. Optical Path Length Change Step

In the optical path length change step S108, the optical path length of the optical path 20 is changed. The change in the optical path length of the optical path 20 may be performed in any pattern, but may be repeated with a constant change width so as to scan a specific range. This makes it possible to efficiently search for an optical path length to be set.

Here, the optical path length of the optical path 20 is referred to as a “second length”. After that, the processing returns to the measurement step S104.

2.5 Measurement Step

In the second measurement step S104, again, the laser interferometer 1 measures displacement or velocity of the sample. Then, a measurement value when the optical path length is the second length is defined as a “second measurement value”. Thereafter, the processing transits to the end determination step S106.

2.6. End Determination Step

In the second end determination step S106, again, whether or not to end the measurement is determined based on whether the measurement values to be compared are prepared or not. Here, since the first measurement value and the second measurement value are already acquired, the measurement values are considered to be prepared and the measurement is ended. Note that, the number of measurement values is set as appropriate in accordance with a range for searching for an optical path length and a change width.

2.7. Measurement Value Comparison Step

In the measurement value comparison step S110, the acquired first measurement value and second measurement value are compared, and an optical path length to be set for the optical path 20 is specified based on a comparison result. For example, when the first measurement value is close to known displacement or velocity of the sample, the first length is specified as the optical path length to be set. Further, when the second measurement value is close to known displacement or velocity of the sample, the second length is specified as the optical path length to be set. When there are many measurement values, an optical path length when a measurement value closest to the displacement or velocity of the sample is obtained is specified as the optical path length to be set.

2.8. Optical Path Length Set Step

In the optical path length set step S112, the optical path length of the optical path 20 is set to the length specified in the measurement value comparison step S110. Accordingly, the optical path difference d of the above Formula (1) can be brought close to 0. As a result, the displacement measurement accuracy $\Delta d$ is less likely to be affected by the line width $\Delta f$ of the emission light L1, or the fluctuation $\Delta n$ of the refractive index of the atmosphere.

Each of the above steps is operation of the controller 57 in the optical system adjustment mode described above. In the measurement mode, the object to be measured 14 is measured while the optical path length of the optical path 20 set in the optical system adjustment mode is maintained. Accordingly, the displacement of the object to be measured 14 can be accurately measured regardless of a type of the light source 2.

As described above, the method for controlling the laser interferometer according to the present exemplary embodiment is a method for controlling the laser interferometer 1 including the light source 2 (laser light source), the polarizing beam splitter 4 (light splitter), the light modulator 12, the optical path length change unit 15, the photoreceptor 10, and includes the preparation step S102, the measurement step S104, the optical path length change step S108, the measurement value comparison step S110, and the optical path length set step S112.

In the preparation step S102, a sample having a known displacement or velocity is prepared as the object to be measured 14.

In the first measurement step S104, when an optical path length between the polarizing beam splitter 4 (light splitter) and the light modulator 12 (optical path length of the optical path 20) is the first length, a light reception signal is acquired from the photoreceptor 10, and the first measurement value, which is displacement or velocity of the sample, is calculated based on the acquired light reception signal.

In the optical path length change step S108, operation of the optical path length change unit 15 is controlled so that the optical path length of the optical path 20 is the second length.

In the second measurement step S104, when the optical path length of the optical path 20 is the second length, a light reception signal is acquired from the photoreceptor 10, and the second measurement value, which is displacement or velocity of the sample, is calculated based on the acquired light reception signal.

In the measurement value comparison step S110 and the optical path length set step S112, when the first measurement value is close to the known displacement or velocity of the sample, the optical path length of the optical path 20 is set to the first length, and when the second measurement value is close to the known displacement or velocity of the sample, the optical path length of the optical path 20 is set to the second length. Note that, when the optical path length of the optical path 20 is set to the "first length" or "second length", it is not necessary to set to exactly the same length as the optical path length of the optical path 20 when the first measurement value or the second measurement value is acquired in the measurement step S104, and the length may be slightly different. That is, a concept may be adopted in which, when respective ranges of the "first length" and the "second length" in the optical path length set step S112 include the optical path length of the optical path 20 at the time of measurement, and the ranges do not overlap, the lengths each have a predetermined width.

According to such a method for controlling, the optical path difference d of the above Formula (1) can be brought close to 0, and the setting of the optical system 50 is easily realized in which the displacement measurement accuracy $\Delta d$ is less likely to be affected by the line width $\Delta f$ of the emission light L1. Then, by using the optical system 50 adjusted in this manner, it is possible to accurately measure the displacement of the object to be measured 14, regardless of the type of the light source 2.

Additionally, since the optical system 50 is adjusted as described above, even when the light source 2 having a relatively large line width $\Delta f$ of the emission light L1 is used, the displacement measurement accuracy $\Delta d$ is less likely to decrease. Accordingly, options of the light source 2 can be increased without sacrificing the displacement measurement accuracy $\Delta d$.

3. Third Exemplary Embodiment

Next, a laser interferometer according to a third exemplary embodiment will be described.

Figure 8:
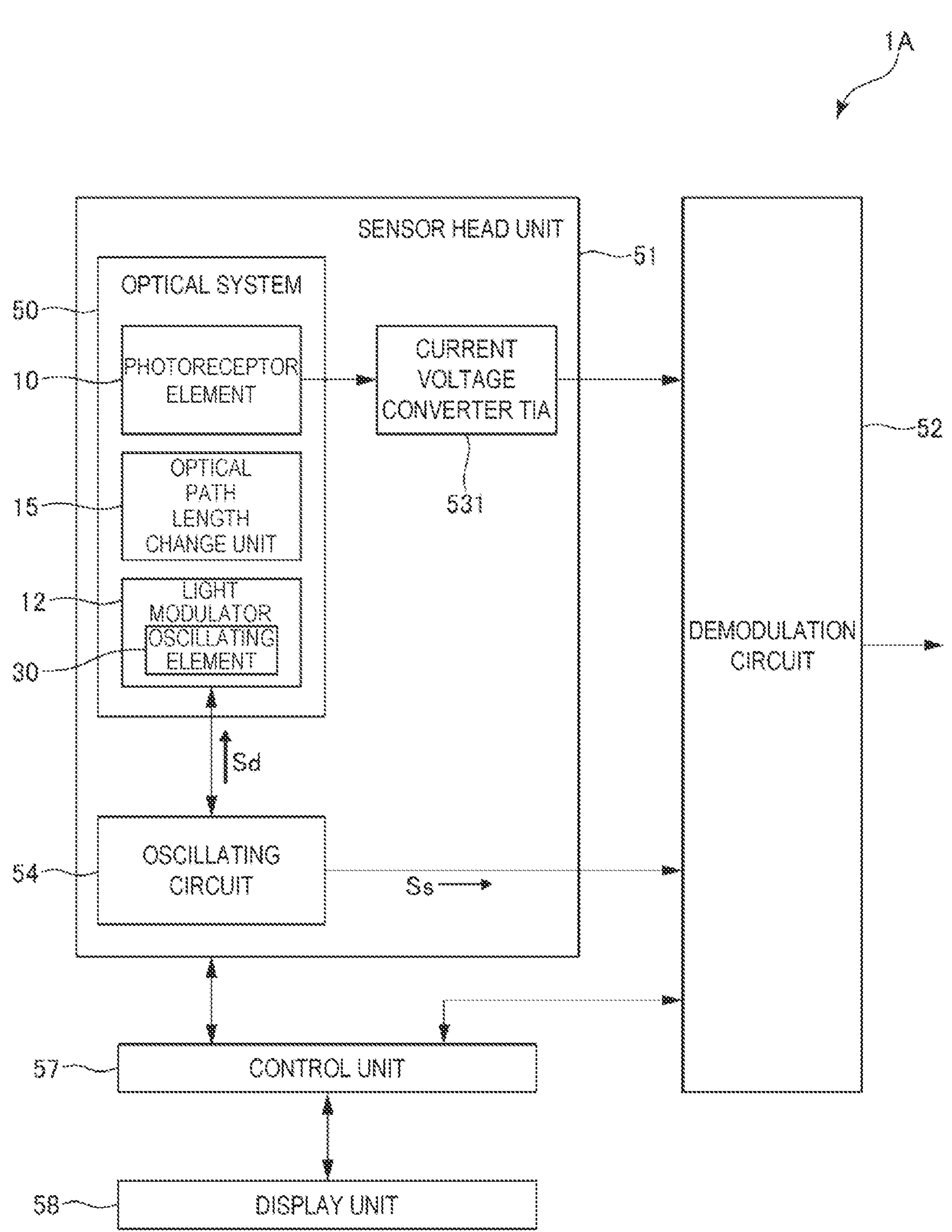
FIG. 8 is a function block diagram illustrating a laser interferometer according to a third exemplary embodiment.
Figure 9:
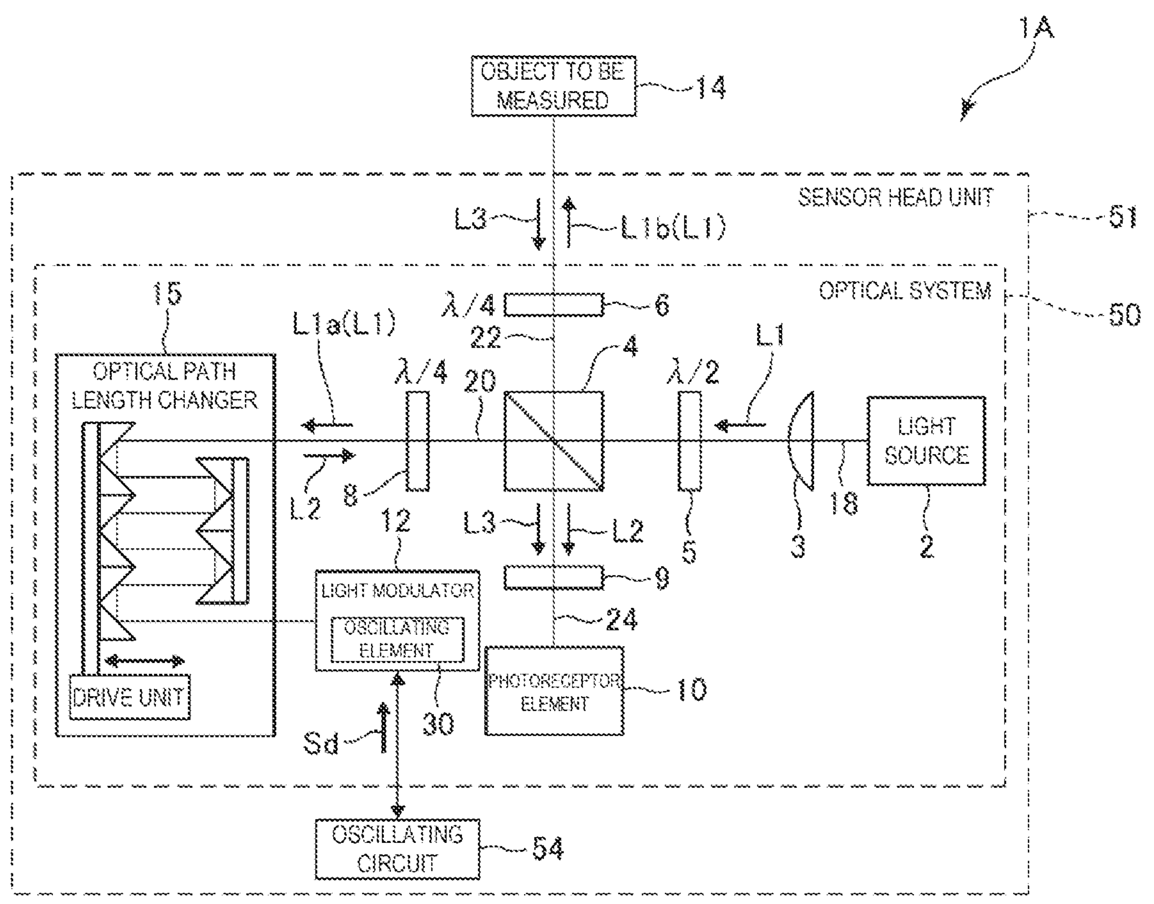
FIG. 9 is a schematic configuration diagram of a sensor head unit illustrated in FIG. 8.

FIG. 8 is a function block diagram illustrating the laser interferometer according to the third exemplary embodiment. FIG. 9 is a schematic configuration diagram of the sensor head unit 51 illustrated in FIG. 8.

Hereinafter, the third exemplary embodiment will be described, but in the description below, with a focus on differences from the first exemplary embodiment, and descriptions of similar matters will be omitted. Note that, in each figure, the same reference numbers are given to the same configurations as in the first exemplary embodiment.

The third exemplary embodiment is similar to the first exemplary embodiment, except that a configuration of a light modulator is different.

In the laser interferometer 1 according to the first exemplary embodiment described above, the light modulator 12 includes the AOM 60. In contrast, in a laser interferometer 1A according to the third exemplary embodiment, the light modulator 12 includes an oscillator 30. Even in such a light modulator 12, as in the light modulator 12, a frequency of the transmitted light L1*a* can be shifted to generate the reference light L2.

3.1. Overview of First Configuration Example of Light Modulator

Figure 10:
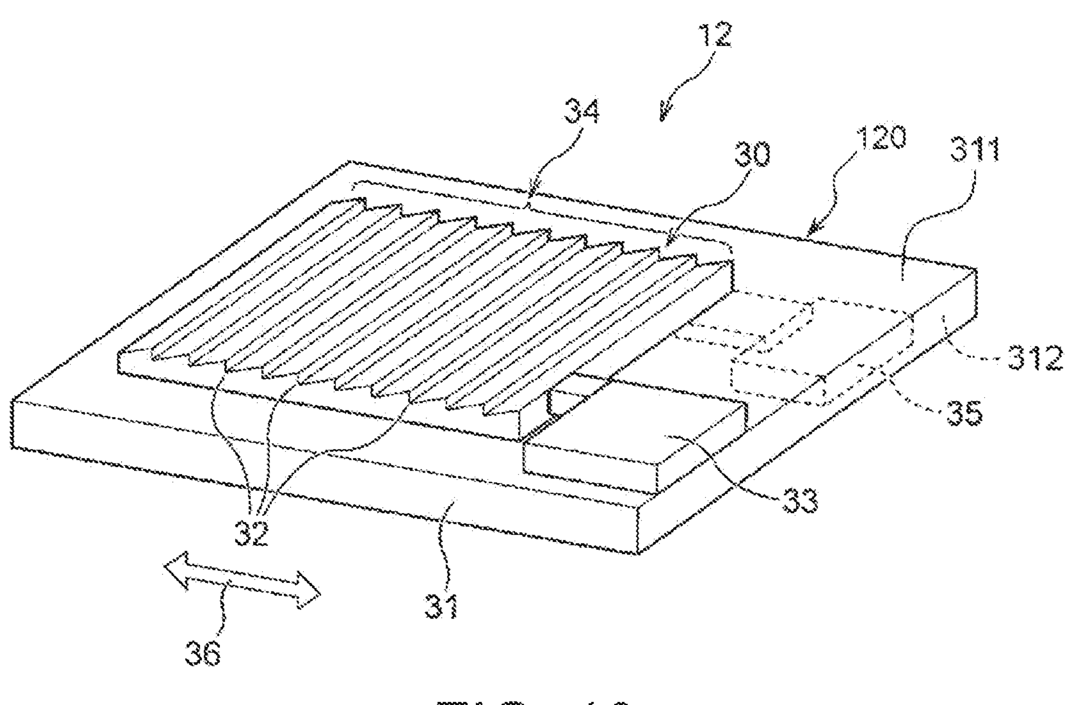
FIG. 10 is a perspective view illustrating a first configuration example of a light modulator illustrated in FIG. 9.

FIG. 10 is a perspective view illustrating a first configuration example of the light modulator 12 illustrated in FIG. 9.

The frequency-shifter type light modulator 12 has a light modulating oscillator 120. The light modulating oscillator 120 illustrated in FIG. 10 includes the oscillator 30 having a plate-shape and a substrate 31 that supports the oscillator 30.

The oscillator 30 is formed of a material that repeats a mode of oscillating so as to deform in a direction along a surface by being applied with a potential. In the present configuration example, the oscillator 30 is a crystal AT oscillator that generates thickness shear oscillations along an oscillating direction 36 in a high-frequency region of a MHz band. A diffraction grating 34 is formed at a surface of the oscillator 30. The diffraction grating 34 has structure in which a plurality of linear grooves 32 are periodically aligned.

The substrate 31 has a front surface 311 and a back surface 312 that mutually have a front-back relationship. The oscillator 30 is disposed at the front surface 311. Additionally, the front surface 311 is provided with a pad 33 for applying a potential to the oscillator 30. On the other hand, the back surface 312 is also provided with a pad 35 for applying a potential to the oscillator 30.

As for a size of the substrate 31, for example, a long side is approximately from 0.5 mm to 10.0 mm. Further, a thickness of the substrate 31 is, for example, approximately from 0.10 mm to 2.0 mm. As an example, a shape of the substrate 31 is a square with one side of 1.6 mm, and a thickness thereof is 0.35 mm.

As for a size of the oscillator 30, for example, a long side is approximately from 0.2 mm to 3.0 mm. Further, a thickness of the oscillator 30 is, for example, approximately from 0.003 mm to 0.5 mm.

As an example, a shape of the oscillator 30 is a square with one side of 1.0 mm, and a thickness thereof is 0.07 mm. In this case, the oscillator 30 oscillates at a basic oscillation frequency of 24 MHz. Note that, it is possible to adjust an oscillation frequency in a range of 1 MHz to 1 GHz, by changing the thickness of the oscillator 30 or even considering an overtone.

Note that, in FIG. 10, the diffraction grating 34 is formed at the entire surface of the oscillator 30, but may only be formed in a portion.

Intensity of light modulation by the light modulator 12 is given by an inner product of a difference wave vector between a wave vector of the transmitted light L1*a* incident on the light modulator 12 and a wave vector of the reference light L2 emitted from the light modulator 12, and a vector in the oscillating direction 36 of the oscillator 30. In the present configuration example, the oscillator 30 generates thickness shear oscillations, but this oscillation is an in-plane oscillation, and thus light modulation is not possible even when light is incident perpendicular on a surface of a single oscillator 30. Therefore, in the present configuration example, by providing the diffraction grating 34 in the oscillator 30, light modulation is made possible by a principle described later.

The diffraction grating 34 illustrated in FIG. 10 is a blazed diffraction grating. The blazed diffraction grating refers to a diffraction grating in which a cross-sectional shape is stepped. The linear groove 32 of the diffraction grating 34 is provided so that an extending direction thereof is perpendicular to the oscillating direction 36.

When the drive signal Sd is supplied to the oscillator 30 illustrated in FIG. 10 from the oscillating circuit 54 illustrated in FIG. 9 (an AC voltage is supplied), the oscillator 30 oscillates. Power required for oscillating the oscillator 30 (drive power) is not particularly limited, but is approximately from 0.1 μW to 100 mW and is small. Thus, the drive signal Sd output from the oscillating circuit 54 can be used, without being amplified, to oscillate the oscillator 30.

Also, the oscillator 30 is very small in volume, and the power required for oscillation is also small. Therefore, by using the light modulator 12 provided with the oscillator 30, it is easy to miniaturize the laser interferometer 1 and save power.

3.2. Method for Forming Diffraction Grating

A method for forming the diffraction grating 34 is not particularly limited, but as an example, a method can be cited for forming a mold with a method using a mechanical grooved type (ruling engine), to form the groove 32 at an electrode formed at a surface of the oscillator 30 of a crystal AT oscillator with a nanoimprint method. Here, the reason why the groove 32 is formed at the surface is that, in the case of the crystal AT oscillator, it is possible in principle to generate high quality thickness shear oscillations at the electrode. Note that, the groove 32 is formed not only at the electrode, and may be formed at a surface of a material of a non-electrode portion. In addition, instead of the nanoimprint method, a processing method by exposure and etching, an electron beam drawing lithography method, a focused ion beam processing (FIB) method, and the like may be used.

Also, a diffraction grating may be formed at a chip of a crystal AT oscillator with a resist material, and a mirror film formed of a metal film or a dielectric multilayer film may be provided thereat. By providing the metal film or the mirror film, reflectance of the diffraction grating 34 can be increased.

Furthermore, a resist film may be formed at a chip and a wafer of a crystal AT oscillator, and after processing by etching, the resist film may be removed, and then a metal film or a mirror film may be formed at the processed surface. In this case, since the resist material is removed, an effect due to moisture absorption of the resist material or the like is eliminated, and chemical stability of the diffraction grating 34 can be enhanced. In addition, by providing a metal film having high conductivity made of Au, AL, or the like, the diffraction grating can also be used as an electrode for driving the oscillator 30.

Note that, the diffraction grating 34 may be formed using techniques such as anodized alumina (porous alumina).

3.3. Other Configuration Examples of Light Modulator

The oscillator 30 is not limited to a crystal oscillator, and may be, for example, an Si oscillator, a ceramic oscillator, a surface acoustic wave (SAW) device, or the like.

Figure 11:
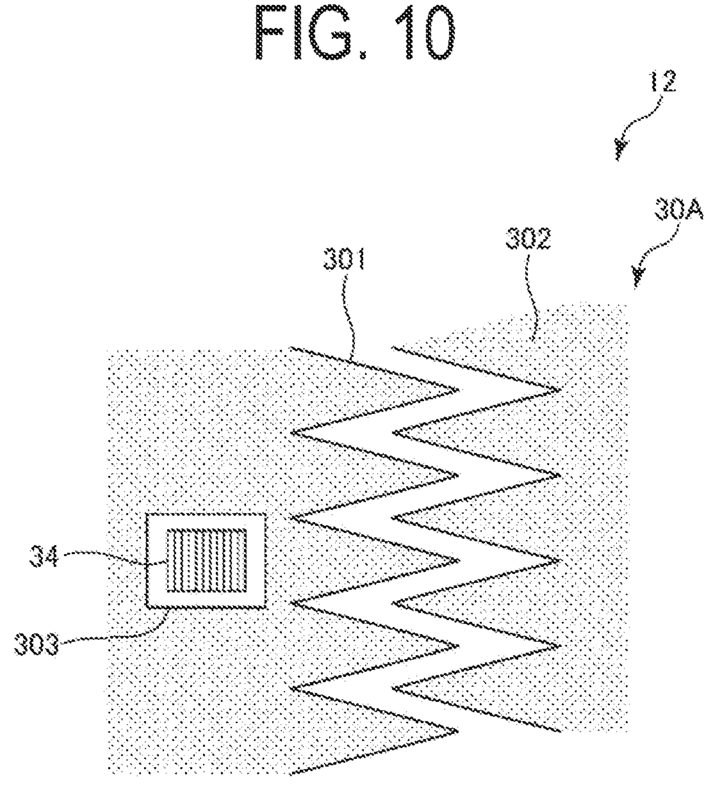
FIG. 11 is a plan view illustrating a part of a second configuration example of the light modulator illustrated in FIG. 9.
Figure 12:
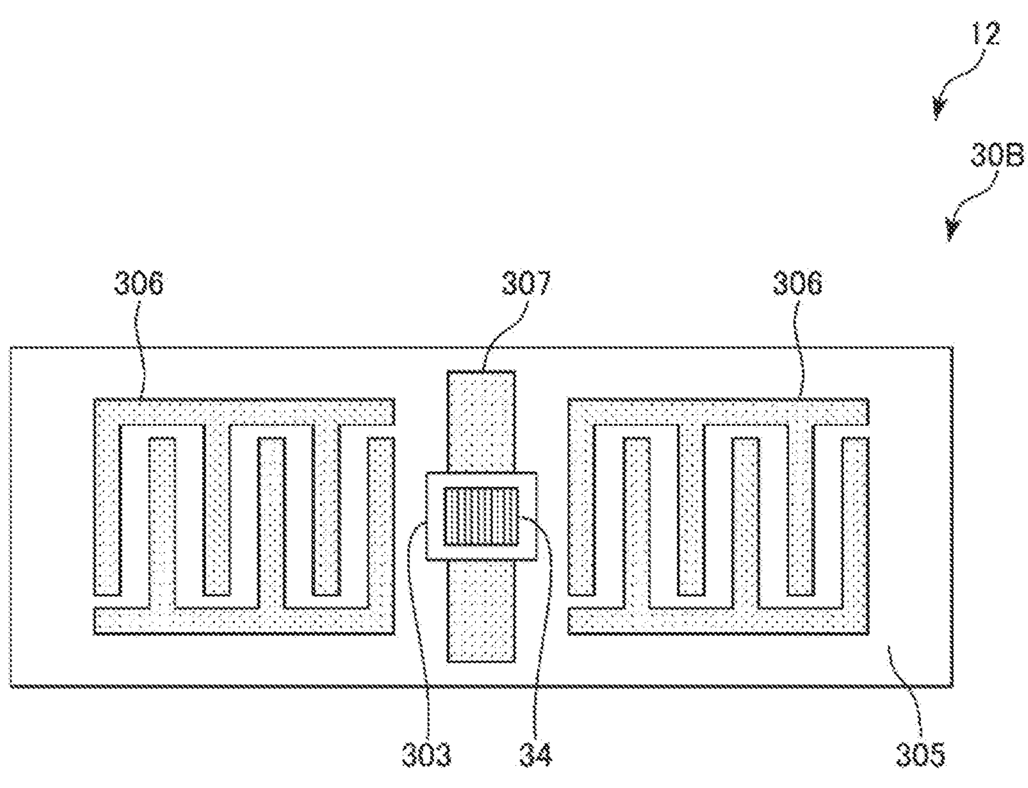
FIG. 12 is a plan view illustrating a third configuration example of the light modulator illustrated in FIG. 9.

FIG. 11 is a plan view illustrating a part of a second configuration example of the light modulator 12 illustrated in FIG. 9. FIG. 12 is a plan view illustrating a third configuration example of the light modulator 12 illustrated in FIG. 9.

An oscillator 30A illustrated in FIG. 11 is an Si oscillator manufactured using an MEMS technology. The MEMS is a micro electro mechanical system.

The oscillator 30A includes a first electrode 301 and a second electrode 302 adjacent to each other in the same plane via a gap, a diffraction grating placement portion 303 provided at the first electrode 301, and the diffraction grating 34 provided at the diffraction grating placement portion 303. The first electrode 301 and the second electrode 302 oscillate, for example, so as to repeat mutual approaching and separating, in a left-right direction of FIG. 11, that is, along an axis linking the first electrode 301 and the second electrode 302 illustrated in FIG. 6, with electrostatic attraction as driving force. Accordingly, in-plane oscillations can be given to the diffraction grating 34. An oscillation frequency of the Si oscillator is, for example, approximately from 1 kHz to several hundred MHz.

An oscillator 30B illustrated in FIG. 12 is an SAW device that utilizes a surface wave. SAW stands for elastic surface wave.

The oscillator 30B includes a piezoelectric substrate 305, a comb-shaped electrode 306 provided at the piezoelectric substrate 305, a ground electrode 307, a diffraction grating placement portion 303, and the diffraction grating 34. When an AC voltage is applied to the comb-shaped electrode 306, an inverse piezoelectric effect causes a surface acoustic wave to be excited. Accordingly, in-plane oscillations can be given to the diffraction grating 34. An oscillation frequency of the SAW device is, for example, approximately from several hundred MHz to several GHz.

For the device as described above, providing the diffraction grating 34 makes light modulation possible according to a principle described later, as in the case of the crystal AT oscillator.

On the other hand, when the oscillator 30 includes a crystal oscillator, a highly accurate modulation signal can be generated by utilizing a very high Q value that crystal has. The Q value is an indication that indicates sharpness of a peak of resonance. Also, the crystal oscillator has an advantage of being less susceptible to disturbances. Thus, by using a modulation signal modulated by the light modulator 12 including the crystal oscillator, a sample signal derived from the object to be measured 14 can be acquired with high accuracy.

3.4. Light Modulation by Oscillator

Next, a principle for modulating light using the oscillator 30 will be described.

Figure 13:
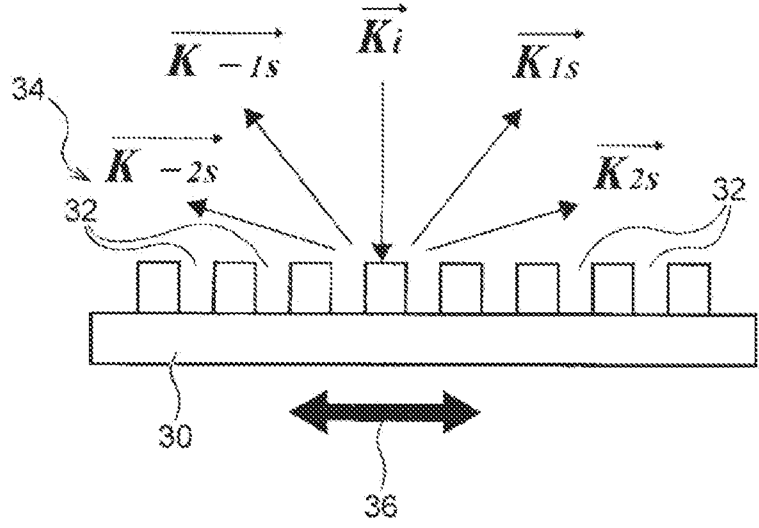
FIG. 13 is a conceptual diagram for explaining that a plurality of diffracted rays occur when an incident light $K_i$ is incident from a direction perpendicular to a front surface of an oscillator.

FIG. 13 is a conceptual diagram for explaining that a plurality of diffracted rays occur when the incident light $K_i$ is incident from a direction perpendicular to a surface of the oscillator 30.

When the incident light $K_i$ is incident on the diffraction grating 34 that generates thickness shear oscillations along the oscillating direction 36, due to a diffraction phenomenon, a plurality of diffracted rays $K_{ns}$ occur, as illustrated in FIG. 13. n is an order of the diffracted ray $K_{ns}$, and n=0, ±1, ±2, . . . . Note that, as the diffraction grating 34 illustrated in FIG. 13, a diffraction grating formed by repeating concavity and convexity as an example of another diffraction grating, rather than the blazed diffraction grating illustrated in FIG. 10. Further, in FIG. 13, illustration of the diffracted ray $K_{0s}$ is omitted.

In FIG. 13, the incident light $K_i$ is incident from a direction perpendicular to a surface of the oscillator 30, but the incident angle is not particularly limited, and the incident angle may be set so that the incident light is obliquely incident on the surface of the oscillator 30. When obliquely incident, an advancing direction of the diffracted ray $K_{ns}$ also changes correspondingly.

Note that, depending on design of the diffraction grating 34, a high-order ray, where $|n| \geq 2$, does not appear in some cases. Therefore, $|n|=1$ may be set in order to obtain a modulation signal stably. In other words, in the laser interferometer 1A in FIG. 9, the frequency-shifter type light modulator 12 may be disposed such that ±1st-order diffracted rays are utilized as the reference light L2. This disposition makes it possible to achieve stabilization of measurement by the laser interferometer 1A.

On the other hand, the light modulator 12 may be disposed such that, when a high-order ray appears, where $|n| \geq 2$, from the diffraction grating 34, any diffracted rays of ±2nd order or above, rather than ±1st diffracted rays, are utilized as the reference light L2. As a result, a high-order diffracted ray can be utilized, and thus higher frequency and miniaturization for the laser interferometer 1A can be achieved.

In the present exemplary embodiment, as an example, the light modulator 12 is configured so that an angle formed by an entry direction of the incident light $K_i$ incident on the light modulator 12 and an advancing direction of the reference light L2 emitted from the light modulator 12 is 180°. Hereinafter, three examples will be described.

Figure 14:
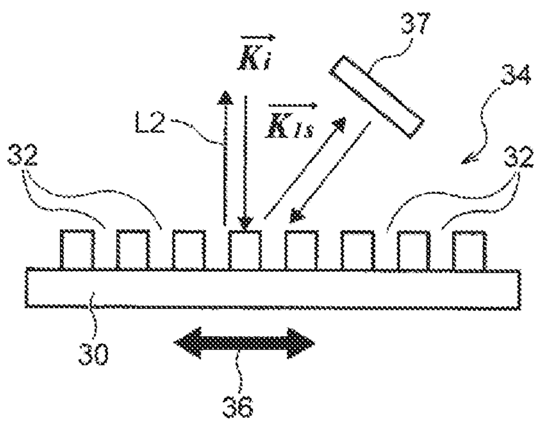
FIG. 14 is a conceptual diagram for explaining a light modulator configured such that an angle formed by an advancing direction of the incident light $K_i$ and an advancing direction of reference light L2 is 180°.
Figure 15:
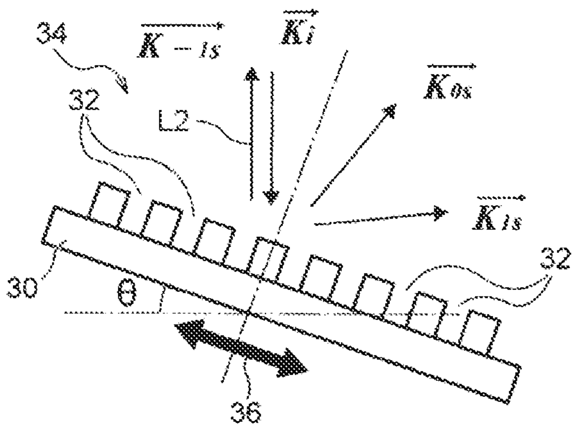
FIG. 15 is a conceptual diagram for explaining the light modulator configured such that the angle formed by the advancing direction of the incident light $K_i$ and the advancing direction of the reference light L2 is 180°.
Figure 16:
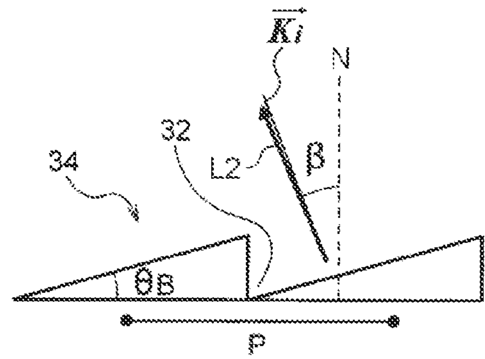
FIG. 16 is a conceptual diagram for explaining the light modulator configured such that the angle formed by the advancing direction of the incident light $K_i$ and the advancing direction of the reference light L2 is 180°.

FIG. 14 to FIG. 16 are each a conceptual diagram for explaining the light modulator 12 configured such that an angle formed by an advancing direction of the incident light $K_i$ and the advancing direction of the reference light L2 is 180°.

In FIG. 14, the light modulator 12 includes a mirror 37 in addition to the oscillator 30. The mirror 37 is disposed so as to reflect and return the diffracted ray $K_{1s}$ to the diffraction grating 34. At this time, an angle formed by an incident angle of the diffracted ray $K_{1s}$ on the mirror 37 and a reflection angle at the mirror 37 is 180°. As a result, the diffracted ray $K_{1s}$ that is emitted from the mirror 37 and returned to the diffraction grating 34 is again diffracted at the diffraction grating 34, and advances in an opposite direction to the advancing direction of the incident light $K_i$ incident on light modulator 12. Thus, by adding the mirror 37, the above-described condition can be satisfied that the angle formed by the entry direction of the incident light $K_i$ and the advancing direction of the reference light L2 is 180°.

Further, by passing the mirror 37 in this manner, the reference light L2 generated by the light modulator 12 is subjected to frequency modulation twice. Therefore, by using the mirror 37 in combination, frequency modulation at a higher frequency is possible compared to a case where a single oscillator 30 is used.

In FIG. 15, the oscillator 30 is inclined compared to the disposition in FIG. 13. At this time, an inclination angle θ is set so as to satisfy the above-described condition that the entry direction of the incident light $K_i$ and the advancing direction of the reference light L2 is 180°.

The diffraction grating 34 illustrated in FIG. 16 is a blazed grating having a blazed angle of $\theta_B$. Then, when the incident light $K_i$ advancing at an incident angle β with respect to a normal line N on a surface of the oscillator 30 is incident on the diffraction grating 34, the reference light L2 returns at the same angle as the blaze angle $\theta_B$ with respect to the normal line N. Thus, by making the incident angle β equal to the blaze angle $\theta_B$, the above-described condition can be satisfied that the angle formed by the entry direction of the incident light $K_i$ and the advancing direction of the reference light L2 is 180°. In this case, the above condition can be satisfied without using the mirror 37 illustrated in FIG. 14, or without inclining the oscillator 30 itself as illustrated in FIG. 15, and thus further miniaturization and higher frequency for the laser interferometer 1 can be achieved. In particular, in the case of the blazed diffraction grating, disposition satisfying the above condition is referred to as a "Littrow disposition", and there is also an advantage that diffraction efficiency of a diffracted ray can be particularly enhanced.

Note that, a pitch P in FIG. 16 represents a pitch of the blazed diffraction grating, and as an example, the pitch P is 1 μm. In addition, the blaze angle $\theta_B$ is 25°. In this case, it is sufficient that the incident angle β with respect to the normal line N of the incident light $K_i$ is also set to 25° in order to satisfy the above condition.

3.5. Package Structure

Figure 17:
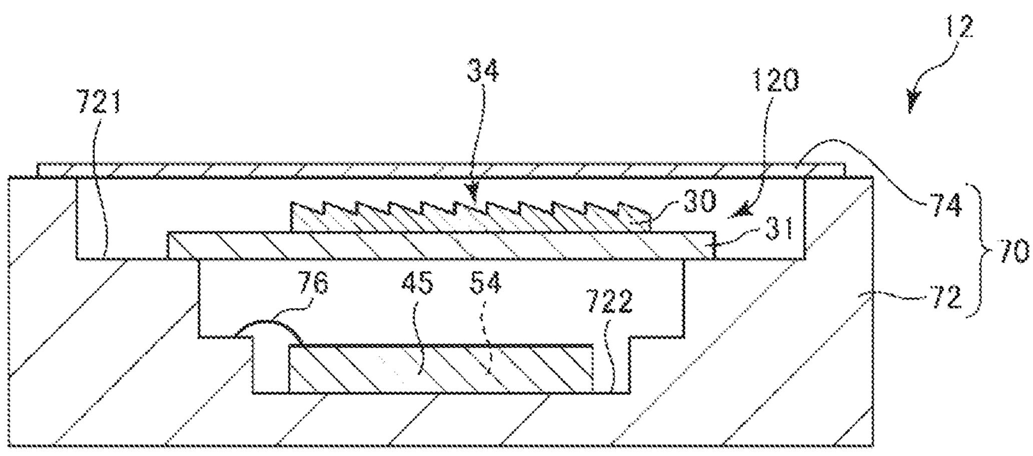
FIG. 17 is a cross-sectional view illustrating the light modulator having package structure.

FIG. 17 is a cross-sectional view illustrating the light modulator 12 having package structure.

The light modulator 12 illustrated in FIG. 17 includes a container 70 that is a housing, the light modulating oscillator 120 accommodated in the container 70, and a circuit element 45 constituting the oscillating circuit 54. Note that, an inside of the container 70 is hermetically sealed with, for example, a reduced-pressure atmosphere such as a vacuum, or an inert gas atmosphere such as nitrogen, argon.

The container 70 has a container body 72 and a lid 74, as illustrated in FIG. 17. Of these, the container body 72 includes a first recessed portion 721 provided therein, and a second recessed portion 722 provided inside the first recessed portion 721 and deeper than the first recessed portion 721. The container body 72 is formed of, for example, a ceramic material, a resin material, or the like. Further, although not illustrated, the container body 72 includes an internal terminal provided at an inner surface, an external terminal provided at an outer surface, a wiring line coupling the internal terminal and the external terminal, and the like.

Also, an opening portion of the container body 72 is sealed by the lid 74 via a sealing member such as a sealing ring or a low melting point glass (not illustrated). A material capable of transmitting laser light, such as a glass material, for example, is used for a constituent material of the lid 74.

The light modulating oscillator 120 is disposed at a bottom surface of the first recessed portion 721. The light modulating oscillator 120 is supported at the bottom surface of the first recessed portion 721 by a bonding member (not illustrated). Also, the internal terminal of the container body 72 and the light modulating oscillator 120 are electrically coupled via a conductive material (not illustrated) such as a bonding wire, a joint metal, or the like, for example.

The circuit element 45 is disposed at a bottom surface of the second recessed portion 722. The circuit element 45 is electrically coupled to the internal terminal of the container body 72 via a bonding wire 76. Thereby, the light modulating oscillator 120 and the circuit element 45 are also electrically coupled via a wiring line included in the container body 72. Note that, a circuit other than the oscillating circuit 54 described later may be provided in the circuit element 45.

By adopting such package structure, the light modulating oscillator 120 and the circuit elements 45 can be overlaid with each other, and thus a physical distance between the two can be reduced, and a wiring length between the light modulating oscillator 120 and the circuit elements 45 can be decreased. Thus, it is possible to prevent noise from entering the drive signal Sd from outside, or conversely, the driving signal Sd from becoming a noise source. Also, in one container 70, both the light modulating oscillator 120 and the circuit element 45 can be protected from an external environment. Therefore, reliability of the laser interferometer 1 can be enhanced while the sensor head unit 51 is miniaturized.

Note that, the structure of the container 70 is not limited to the illustrated structure, and for example, the light modulating oscillator 120 and the circuit element 45 may each have individual package structure. Additionally, although not illustrated, other circuit elements constituting the oscillating circuit 54 may be accommodated in the container 70. Note that, the container 70 only needs to be provided as necessary, and may be omitted.

3.6. Oscillating Circuit

Figure 18:
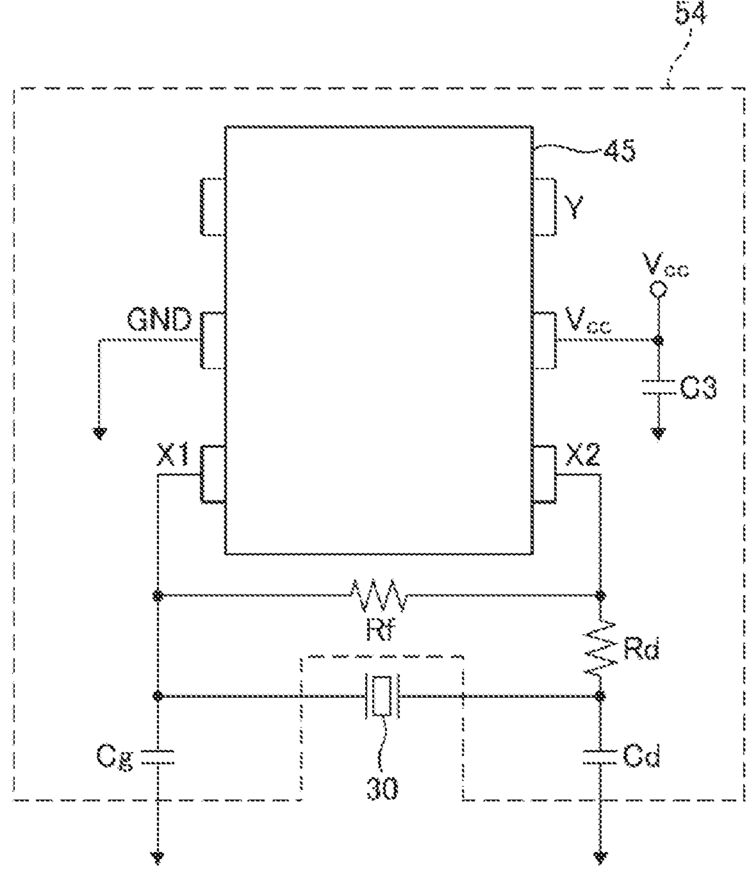
FIG. 18 is a circuit diagram illustrating a configuration of a one-stage inverter oscillating circuit as an example of a circuit configuration of an oscillating circuit.

As illustrated in FIG. 18, the oscillating circuit 54 outputs the drive signal Sd that is input to the light modulator 12 of the optical system 50. Also, as illustrated in FIG. 8, the oscillating circuit 54 outputs the reference signal Ss that is input to the demodulation circuit 52.

The oscillating circuit 54 is not particularly limited as far as the circuit is capable of oscillating the oscillator 30, and circuits having various configurations are used. FIG. 18 is a circuit diagram illustrating a configuration of a one-stage inverter oscillating circuit as an example of a circuit configuration of the oscillating circuit 54.

The oscillating circuit 54 illustrated in FIG. 18 includes the circuit element 45, a feedback resistor Rf, a limiting resistor Rd, a first capacitor Cg, a second capacitor Cd, and a third capacitor C3.

The circuit element 45 is an inverter IC. A terminal X1 and a terminal X2 of the circuit element 45 are each a terminal coupled to an inverter inside the circuit elements 45. A terminal GND is coupled to a ground potential, and a terminal Vcc is coupled to a power source potential. A terminal Y is a terminal for oscillation output.

The first capacitor Cg is coupled between the terminal X1 and the ground potential. Further, the limiting resistor Rd and the second capacitor Cd coupled in series with each other are coupled between the terminal X2 and the ground potential in this order from the terminal X2 side. Furthermore, one end of the feedback resistor Rf is coupled between the terminal X1 and the first capacitor Cg, and another end of the feedback resistor Rf is coupled between the terminal X2 and the limiting resistor Rd.

Additionally, one end of the oscillator 30 is coupled between the first capacitor Cg and the feedback resistor Rf, and another end of the oscillator 30 is coupled between the second capacitor Cd and the limiting resistor Rd. Thus, the oscillator 30 serves as a signal source of the oscillating circuit 54.

Figure 19:
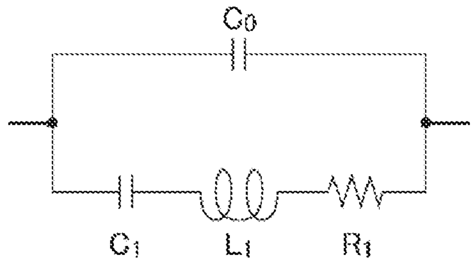
FIG. 19 is an example of an LCR equivalent circuit of an oscillator.

FIG. 19 is an example of an LCR equivalent circuit of the oscillator 30.

As illustrated in FIG. 19, the LCR equivalent circuit of the oscillator 30 is configured with a series capacitance $C_1$, a series inductance $L_1$, an equivalent series resistance $R_1$, and a parallel capacitance $C_0$.

In the oscillating circuit 54 illustrated in FIG. 18, when capacitance of the first capacitor Cg is $C_g$, and capacitance of the second capacitor Cd is $C_d$, a load capacity $C_L$ is given by the following Formula (a).

[Mathematical Equation 2]

$$C_L = \frac{C_d C_g}{C_d + C_g} \tag{a}$$

Thus, an oscillation frequency $f_{osc}$ output from the terminal Y of the oscillating circuit 54 is given by the following Formula (b).

[Mathematical Equation 3]

$$f_{osc} = f_Q\sqrt{1 + \frac{C_1}{C_0 + C_L}} \tag{b}$$

$f_Q$ is a specific frequency of the oscillator 30.

According to the above Formula (b), it can be seen that, by appropriately changing the load capacity $C_L$, the oscillation frequency $f_{osc}$ of a signal output from the terminal Y can be finely tuned.

Also, a difference Δf between the specific frequency $f_Q$ of the oscillator 30, and the oscillation frequency $f_{osc}$ of the oscillating circuit 54 is given by the following Formula (c).

[Mathematical Equation 4]

$$\Delta f = f_{osc} - f_Q = f_Q\left(\sqrt{1 + \frac{C_1}{C_0 + C_L}} - 1\right) \tag{c}$$

Here, since $C_1 << C_0$, $C_1 << C_L$, Δf is given approximately by the following Formula (d).

[Mathematical Equation 5]

$$\Delta f = f_{osc} - f_Q \cong \frac{C_1}{2(C_0 + C_L)} f_Q \tag{d}$$

Therefore, the oscillation frequency $f_{osc}$ of the oscillating circuit 54 is a value corresponding to the specific frequency $f_Q$ of the oscillator 30.

Here, when the oscillator 30 is fixed to the container 70, for example, and is applied with expansion stress by temperature via a fixing portion, the specific frequency $f_Q$ fluctuates. Also, when inclined, the oscillator 30 is affected by gravity due to own weight thereof, or the like, the specific frequency $f_Q$ fluctuates.

In the oscillating circuit 54, even when the specific frequency $f_Q$ fluctuates for such a reason, the oscillation frequency $f_{osc}$ varies, in conjunction with the fluctuation, based on the above Formula (d). That is, oscillation frequency $f_{osc}$ is a value, which is constantly deviated from the specific frequency $f_Q$ by Δf. This makes it possible to stabilize the oscillation of the oscillator 30, and stabilize modulation characteristics of the light modulator 12. As a result, it is possible to increase demodulation accuracy of a sample signal in the demodulation circuit 52.

As an example, $\Delta f = |f_{osc} - f_Q| \leq 3000$ [Hz] may hold, or $\Delta f = |f_{osc} - f_Q| \leq 600$ [Hz] may hold.

In the laser interferometer 1 according to the present exemplary embodiment, the light modulator 12 includes the oscillator 30. The light modulator 12 modulates the transmitted light L1*a* (first split light) using the oscillator 30.

According to such a configuration, the light modulator 12 can be greatly miniaturized and made lighter, compared to the first exemplary embodiment. Thereby, the laser interferometer 1 can be miniaturized and made lighter.

Further, the laser interferometer 1 according to the present exemplary embodiment includes the demodulation circuit 52 and the oscillating circuit 54. As illustrated in FIG. 8, the oscillating circuit 54 outputs the reference signal Ss toward the demodulation circuit 52. The demodulation circuit 52 demodulates a sample signal derived from the object to be measured 14 from a light reception signal based on the reference signal Ss. Then, the oscillator 30 is a signal source of the oscillating circuit 54.

According to such a configuration, even when the specific frequency $f_Q$ of the oscillator 30 fluctuates, the oscillation frequency $f_{osc}$ of oscillating circuit 54 can be varied to a value corresponding to the specific frequency $f_Q$ of oscillator 30, thus it is possible to easily stabilize the oscillation of the oscillator 30. Accordingly, temperature characteristics of a modulation signal can be made to correspond to temperature characteristics of the oscillator 30, and the modulation characteristics of the light modulator 12 can be stabilized. As a result, it is possible to increase demodulation accuracy of a sample signal in the demodulation circuit 52.

Additionally, in the configuration described above, temperature characteristics of the reference signal Ss output from the oscillating circuit 54 to the demodulation circuit 52 can also be made to correspond to the temperature characteristics of the oscillator 30. As a result, both the temperature characteristics of the modulation signal and the temperature characteristics of the reference signal correspond to the temperature characteristics of the oscillator 30, and thus behavior of the fluctuation in the modulation signal associated with a temperature change and behavior of the fluctuation in the reference signal Ss match or approximate. Therefore, even when a temperature of the oscillator 30 changes, an effect on demodulation accuracy can be suppressed, and demodulation accuracy of a sample signal derived from the object to be measured 14 can be increased.

Furthermore, in the first exemplary embodiment described above, since a temperature of crystal needs to be maintained in the AOM 60, power consumption of the laser interferometer 1 tends to be relatively large. In contrast, in the present exemplary embodiment, since power consumption of the oscillating circuit 54 is low, it is possible to facilitate the power saving of the laser interferometer 1.

Hereinbefore, the third exemplary embodiment has been described, but even in such a third exemplary embodiment, the same effects as those of the first exemplary embodiment can be obtained.

4. Fourth Exemplary Embodiment

Next, a laser interferometer according to a fourth exemplary embodiment will be described.

Figure 20:
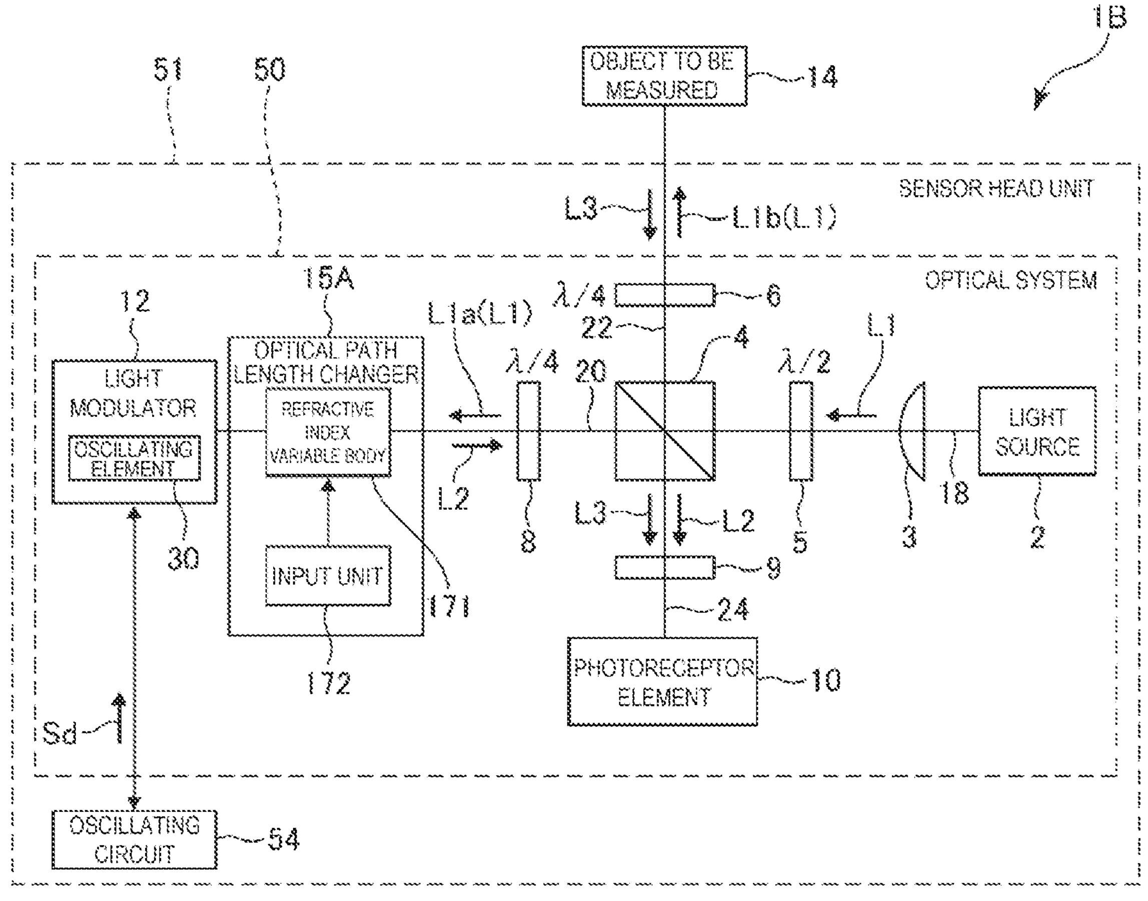
FIG. 20 is a schematic configuration diagram of a sensor head unit included in a laser interferometer according to a fourth exemplary embodiment.
Figure 21:
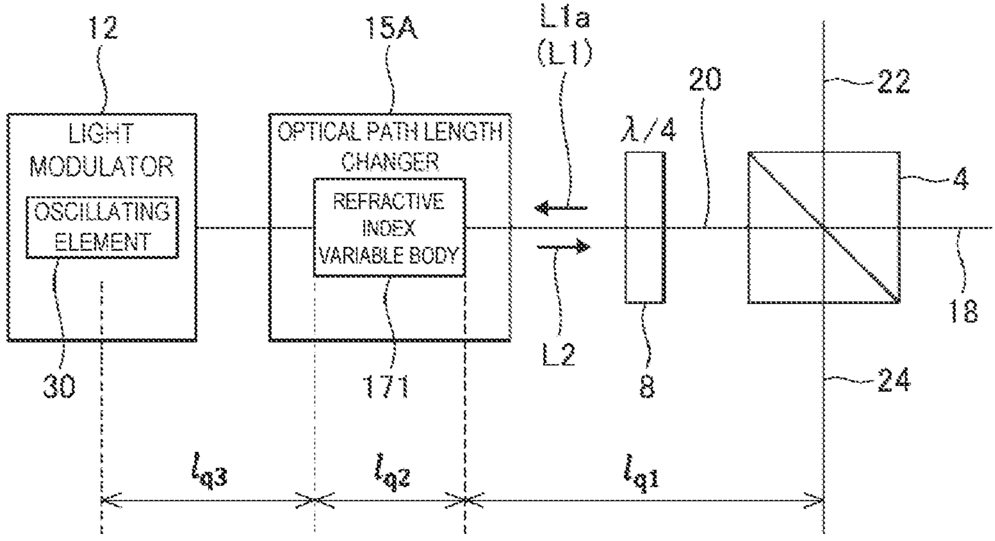
FIG. 21 is a partially enlarged view of FIG. 20.

FIG. 20 is a schematic configuration diagram of the sensor head unit 51 included in the laser interferometer according to the fourth exemplary embodiment. FIG. 21 is a partially enlarged view of FIG. 20.

Hereinafter, the fourth exemplary embodiment will be described, but in the description below, with a focus on differences from the third exemplary embodiment, and descriptions of similar matters will be omitted. Note that, in each figure, the same reference numbers are given to the same configurations as in the third exemplary embodiment.

The fourth exemplary embodiment is similar to the third exemplary embodiment, except that a configuration of an optical path length change unit is different.

In the laser interferometer 1A according to the third exemplary embodiment described above, the optical path length change unit 15 includes the first reflection element 151 and the second reflection element 152. On the other hand, in a laser interferometer 1B according to the fourth exemplary embodiment, as illustrated in FIG. 20, an optical path length change unit 15A includes a refractive index variable body 171 and an input unit 172. The refractive index variable body 171 is disposed on the optical path 20 in which the transmitted light L1*a* (first split light) advances, and a refractive index changes in accordance with a signal input. The input unit 172 inputs a signal to the refractive index variable body 171.

In such an optical path length change unit 15A, an optical path length of the optical path 20 can be changed by changing the refractive index. Further, the optical path length change unit 15A does not have a movable unit, and thus durability and reliability are higher.

The refractive index variable body 171 is a medium disposed on the optical path 20 and having optical transparency, and for example, is a medium in which an electrical field, a magnetic field, heat, light, and the like are control parameters (signals), and the refractive index varies by being input with the control parameter. For example, polymer-dispersed liquid crystal is known as a medium for which an electrical field is the control parameter. A refractive index of the polymer-dispersed liquid crystal changes depending on magnitude of the electrical field applied.

By using the polymer-dispersed liquid crystal as the refractive index variable body 171, it is possible to change the refractive index using the electrical field, which is easy to be controlled, as the control parameter. Therefore, the configuration of the optical path length change unit 15A can be further simplified.

Note that, examples other than the polymer-dispersed liquid crystal include a medium having temperature dependence of a refractive index. Examples of such a medium include, for example, inorganic materials such as quartz glass, organic materials such as acrylic resins, and the like. In addition, in this case, the input unit 172 is a temperature adjustment unit that inputs heat as a control parameter, and examples include, for example, a heat exchange element such as a Peltier element.

An optical path length $L_{20}$ of the optical path 20 in the fourth exemplary embodiment is determined by Formula (2) below.

[Mathematical Equation 6]

$$L_{20}=n_0(l_{q1}+l_{q3})+n_r l_{q2} \quad (2)$$

$n_0$: Refractive Index of Atmosphere $n_r$: Refractive Index of Refractive Index Variable Body 171

$l_{q1}$: Distance from Center of Polarizing Beam Splitter 4 to End of Refractive Index Variable Body 171

$l_{q2}$: Length of Refractive Index Variable Body 171

$l_{q3}$: Distance from End of Refractive Index Variable Body 171 to Center of Light Modulator 12

$l_{q1}$, $l_{q2}$ and $l_{q3}$ in the above Formula (2) correspond to physical distances schematically illustrated in FIG. 21.

When the refractive index of refractive index variable body 171 is adjusted, the optical path length $L_{20}$ of the optical path 20 is calculated based on the above Formula (2), and the optical path length $L_{20}$ can be set to a target value, accordingly.

Hereinbefore, the fourth exemplary embodiment has been described, but even in such a fourth exemplary embodiment, the same effects as those of the third exemplary embodiment can be obtained.

Hereinbefore, although the laser interferometer and the method for controlling the laser interferometer have been described based on the illustrated exemplary embodiments, the laser interferometer of the present disclosure is not limited by the above exemplary embodiments, and the configuration of each of the units can be replaced with any configuration having similar functions. In addition, any other structure may be added to the laser interferometer according to the above exemplary embodiment.

Moreover, the laser interferometer of the present disclosure may be configured by combining any two or more of the above exemplary embodiments and the above respective configuration examples.

Furthermore, the method for controlling the laser interferometer according to the present disclosure may have any target steps added to the above exemplary embodiments.

What is claimed is:

1. A laser interferometer, comprising:

a laser light source configured to emit emission light;

a light splitter configured to split the emission light into first split light, and second split light incident on an object to be measured;

a light modulator disposed on an optical path on which the first split light advances, including an oscillator oscillating by applying a drive signal and at whose surface a mirror film is formed, and configured to modulate the first split light being incident on the mirror film of the oscillator into a reference light having a different frequency from a frequency of the first split light;

an optical path length change unit provided between the light splitter and the light modulator, wherein the optical path length change unit is configured to change a first optical path length, the first optical path length is an optical path length between the light splitter and the light modulator, and the first optical path length is the optical path length of an optical path of the reference light;

a photoreceptor configured to receive an interference light of the reference light and an object light generated by reflecting the emission light at the object to be measured, and to output a light reception signal; and a controller configured to control operation of the optical path length change unit to change the first optical path length based on an optical path difference between the first optical path length and a second optical path length, wherein the second optical path length is an optical path length between the light splitter and the object to be measured, and the second optical path length is the optical path length of an optical path of the second split light.

2. The laser interferometer according to claim 1, wherein the controller controls operation of the optical path length change unit to reduce the optical path difference between the first optical path length and the second optical path length.

3. The laser interferometer according to claim 1, wherein the controller controls operation of the optical path length change unit to satisfy $0 \leq d\Delta f \leq 1\times108$, where the optical path difference between the first optical path length and the second optical path length is d [m], and a line width of the emission light is $\Delta f$ [Hz].

4. The laser interferometer according to claim 1, wherein the optical path length change unit includes a plurality of optical elements that switches the optical path in which the first split light advances, and a drive unit that moves at least one of the plurality of optical elements to change a distance between the plurality of optical elements.

5. The laser interferometer according to claim 4, wherein each of the plurality of optical elements is an element having a light reflecting surface that reflects the first split light.

6. The laser interferometer according to claim 5, wherein each of the plurality of optical elements is one of a right-angle prism mirror or a roof prism mirror.

7. The laser interferometer according to claim 5, wherein the light reflecting surface reflects the first split light a plurality of times.

8. The laser interferometer according to claim 1, wherein the optical path length change unit includes a refractive index variable body that is disposed on the optical path on which the first split light advances, wherein a refractive index of the refractive index variable body is changed in accordance with a signal, and an input unit that inputs the signal to the refractive index variable body.

9. The laser interferometer according to claim 8, wherein the refractive index variable body is formed of polymer-dispersed liquid crystal.

10. The laser interferometer according to claim 1, wherein the laser light source is one of a vertical cavity surface emitting laser diode or a Fabry-Perot semiconductor laser diode.

11. The laser interferometer according to claim 1, wherein the laser light source is an He—Ne laser or a laser diode with fiber bragg grating.

12. The laser interferometer according to claim 1, wherein the oscillator forms a diffraction grating at the surface.

13. The laser interferometer according to claim 12, wherein the mirror film is formed on the diffraction grating.

14. The laser interferometer according to claim 1, further comprising a demodulation circuit configured to demodulate a sample signal based on a reference signal, wherein the sample signal is demodulated from the light reception signal, and the sample signal is derived from the object to be measured; and an oscillating circuit configured to:

output the drive signal to oscillate the oscillator; and output the reference signal to the demodulation circuit, wherein the oscillator is a signal source of the oscillating circuit.

15. The laser interferometer according to claim 14, wherein the oscillation circuit outputs an oscillation frequency corresponding to a specific frequency of the oscillator, and the drive signal and the reference signal correspond to the specific frequency of the oscillator.

16. A method for controlling a laser interferometer including a laser light source configured to emit emission light, a light splitter configured to split the emission light into first split light, and second split light incident on an object to be measured, a light modulator disposed on an optical path on which the first split light advances, including an oscillator oscillating by applying a drive signal and at whose surface a mirror film is formed, and configured to modulate the first split light being incident on the mirror film of the oscillator into a reference light having a different frequency from a frequency of the first split light, an optical path length change unit provided between the light splitter and the light modulator, wherein the optical path length change unit is configured to change a first optical path length, the first optical path length is an optical path length between the light splitter and the light modulator, and the first optical path length is the optical path length of an optical path of the reference light, a photoreceptor configured to receive an interference light of the reference light and an object light generated by reflecting the emission light at the object to be measured, and to output a light reception signal, a controller configured to control operation of the optical path length change unit to change, based on a second optical path length, the first optical path length, wherein the second optical path length is an optical path length between the light splitter and the object to be measured, and the second optical path length is the optical path length of an optical path of the second split light, a demodulation circuit configured to demodulate a sample signal based on a reference signal, wherein the sample signal is demodulated from the light reception signal, and the sample signal is derived from the object to be measured; and an oscillating circuit configured to:

output the drive signal to oscillate the oscillator; and output the reference signal to the demodulation circuit, wherein the oscillator is a signal source of the oscillating circuit, the method for controlling comprising:

preparing a sample of which one of a displacement or a velocity is known, as the object to be measured;

acquiring the light reception signal when the first optical path length between the light splitter and the light modulator is a first length;

calculating a first measurement value being a displacement or a velocity of the sample based on the light reception signal acquired;

controlling operation of the optical path length change unit such that the first optical path length between the light splitter and the light modulator is a second length, wherein the controlling operation of the optical path length change unit is based on an optical path difference between the first optical path length and the second optical path length;

acquiring the light reception signal when the first optical path length between the light splitter and the light modulator is the second length;

calculating a second measurement value being a displacement or a velocity of the sample based on the light reception signal acquired; and setting the first optical path length between the light splitter and the light modulator to the first length, when the first measurement value is close to the displacement or the velocity of the sample which is known, and setting the first optical path length between the light splitter and the light modulator to the second length, when the second measurement value is close to the displacement or the velocity of the sample which is known.

* * * * *